(12) United States Patent
Sutherland et al.

(10) Patent No.: US 10,597,917 B2
(45) Date of Patent: Mar. 24, 2020

(54) STRETCHABLE ADJUSTABLE-STIFFNESS ASSEMBLIES

(71) Applicant: GM Global Technology Operations LLC, Detroit, MI (US)

(72) Inventors: Ian J. Sutherland, Grosse Pointe, MI (US); Michael J. Walker, Shelby Township, MI (US); Wonhee M. Kim, Royal Oak, MI (US); Paul W. Alexander, Ypsilanti, MI (US); Richard J. Skurkis, Lake Orion, MI (US); Amberlee S. Haselhuhn, Troy, MI (US); Xiujie Gao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 110 days.

(21) Appl. No.: 15/728,034

(22) Filed: Oct. 9, 2017

(65) Prior Publication Data
US 2019/0106916 A1     Apr. 11, 2019

(51) Int. Cl.
*E05C 17/00*     (2006.01)
*B60R 5/04*     (2006.01)
(Continued)

(52) U.S. Cl.
CPC .............. *E05C 17/025* (2013.01); *B60R 5/04* (2013.01); *B60J 1/2011* (2013.01); *B60J 1/2041* (2013.01); *B60P 7/065* (2013.01)

(58) Field of Classification Search
CPC .............. Y10T 16/61; E05Y 2900/132; E05Y 2201/224; E05D 11/1014; E05D 11/00;
(Continued)

(56) References Cited

U.S. PATENT DOCUMENTS 3,050,334 A    8/1962    Friedrich
5,009,465 A    4/1991    Induni
(Continued)

FOREIGN PATENT DOCUMENTS

CN    109624671 A    4/2019
CN    109624672 A    4/2019
(Continued)

OTHER PUBLICATIONS

Kim et al.; U.S. Appl. No. 15/727,757, filed Oct. 9, 2017 entitled "Conformable and Reconfigurable Occupant Support Structure"; 27 pages.
(Continued)

*Primary Examiner* — Justin B Rephann
(74) *Attorney, Agent, or Firm* — Harness, Dickey & Pierce, P.L.C.

(57) ABSTRACT

A stretchable adjustable-stiffness assembly includes a casing and first and second friction layers. The casing can be fluidly sealed and includes an interior compartment containing a fluid. The fluid can shift between a first interior pressure and a second interior pressure less than the first interior pressure and an exterior pressure. The first and second friction layers are disposed within the interior compartment. The assembly can shift between relaxed and fixed configurations. In the relaxed configuration, the fluid has the first interior pressure, the casing is stretchable between a first dimension and a second dimension greater than the first dimension, and the assembly has a first stiffness. In the fixed configuration, the first fluid has the second interior pressure, the casing length is fixed, the first and second friction layers are engaged, and the assembly has a second stiffness greater than the first stiffness.

16 Claims, 15 Drawing Sheets

Figure 1:
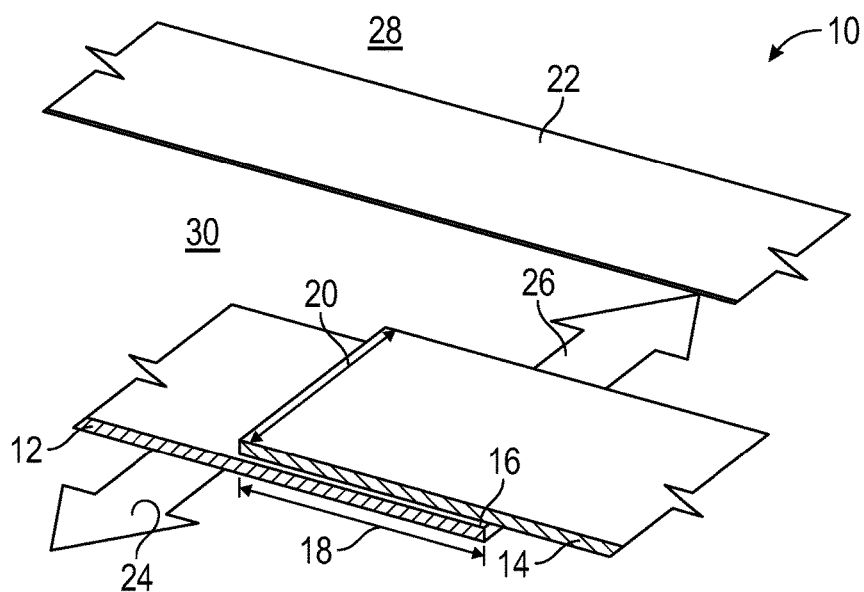

(51) Int. Cl.
*B60J 1/20* (2006.01)
*B60P 7/06* (2006.01)

(58) Field of Classification Search
CPC ...... E05D 11/10; Y10S 292/15; E05C 17/025; B60R 5/04; B60J 1/2011
See application file for complete search history.

(56) References Cited

U.S. PATENT DOCUMENTS

| | | | |
|---|---|---|---|
| 5,267,774 A | 12/1993 | Garner et al. | |
| 6,520,572 B1 | 2/2003 | Niederman et al. | |
| 6,971,827 B1 * | 12/2005 | Embach | B60P 7/0876 296/97.23 |
| 7,178,395 B2 | 2/2007 | Browne et al. | |
| 7,258,347 B2 | 8/2007 | Keefe et al. | |
| 7,299,630 B2 | 11/2007 | Browne et al. | |
| 7,331,616 B2 | 2/2008 | Brei et al. | |
| 7,332,688 B2 | 2/2008 | Browne et al. | |
| 7,334,468 B2 | 2/2008 | Browne et al. | |
| 7,478,845 B2 | 1/2009 | Mankame et al. | |
| 7,484,735 B2 | 2/2009 | Verbrugge et al. | |
| 7,548,010 B2 | 6/2009 | Browne et al. | |
| 7,677,639 B2 | 3/2010 | Cafeo et al. | |
| 7,685,859 B2 | 3/2010 | Ukpai et al. | |
| 7,770,958 B2 | 8/2010 | Bunsmann | |
| 7,770,959 B2 | 8/2010 | Browne et al. | |
| 7,815,232 B2 | 10/2010 | Henry et al. | |
| 7,815,233 B2 | 10/2010 | Henry et al. | |
| 7,845,648 B2 | 12/2010 | Keefe et al. | |
| 7,963,360 B2 | 6/2011 | Johnson et al. | |
| 7,971,393 B2 | 7/2011 | Gao et al. | |
| 7,993,537 B2 | 8/2011 | Hector, Jr. et al. | |
| 8,069,963 B2 | 12/2011 | Browne et al. | |
| 8,104,793 B2 | 1/2012 | Browne et al. | |
| 8,109,042 B2 | 2/2012 | McKnight et al. | |
| 8,109,087 B2 | 2/2012 | Usoro et al. | |
| 8,188,757 B2 | 5/2012 | Herrera et al. | |
| 8,240,677 B2 | 8/2012 | Browne et al. | |
| 8,272,214 B2 | 9/2012 | Mankame et al. | |
| 8,436,571 B2 | 5/2013 | Hao et al. | |
| 8,661,810 B2 | 3/2014 | Browne et al. | |
| 8,708,787 B2 | 4/2014 | Alexander et al. | |
| 8,733,097 B2 | 5/2014 | Mankame et al. | |
| 8,741,076 B2 | 6/2014 | Gao et al. | |
| 8,766,564 B2 | 7/2014 | Gao et al. | |
| 8,773,835 B2 | 7/2014 | Johnson et al. | |
| 8,797,703 B2 | 8/2014 | Browne | |
| 8,804,294 B2 | 8/2014 | Browne | |
| 8,810,234 B2 | 8/2014 | Gao et al. | |
| 8,850,901 B2 | 10/2014 | Mankame et al. | |
| 8,853,916 B2 | 10/2014 | Browne et al. | |
| 8,857,273 B2 | 10/2014 | Mankame et al. | |
| 8,881,521 B2 | 11/2014 | Browne et al. | |
| 8,947,099 B2 | 2/2015 | Gao et al. | |
| 8,966,893 B2 | 3/2015 | Mance et al. | |
| 8,998,320 B2 | 4/2015 | Mankame et al. | |
| 9,004,551 B2 | 4/2015 | Browne et al. | |
| 9,021,801 B2 | 5/2015 | Gao et al. | |
| 9,022,682 B2 | 5/2015 | Skurkis et al. | |
| 9,067,526 B2 | 6/2015 | Browne et al. | |
| 9,091,252 B2 | 7/2015 | Buravalla et al. | |
| 9,157,398 B2 | 10/2015 | Browne et al. | |
| 9,234,509 B2 | 1/2016 | Mankame et al. | |
| 9,236,207 B2 | 1/2016 | Browne et al. | |
| 9,255,619 B2 | 2/2016 | Zavattieri et al. | |
| 9,316,212 B2 | 4/2016 | Browne et al. | |
| 9,353,734 B2 | 5/2016 | Strom et al. | |
| 9,581,146 B2 * | 2/2017 | Shome | F03G 7/065 |
| 9,746,044 B1 | 8/2017 | Skurkis et al. | |
| 9,748,062 B2 | 8/2017 | Pinto, IV et al. | |
| 10,286,764 B2 | 5/2019 | Kim et al. | |
| 10,308,101 B2 | 6/2019 | Kim et al. | |
| 2005/0198904 A1 | 9/2005 | Browne et al. | |
| 2005/0199455 A1 | 9/2005 | Browne et al. | |
| 2005/0205364 A1 | 9/2005 | Browne et al. | |
| 2005/0212304 A1 | 9/2005 | Herrera et al. | |
| 2005/0230195 A1 | 10/2005 | Jones et al. | |
| 2005/0230925 A1 | 10/2005 | Browne et al. | |
| 2005/0263359 A1 | 12/2005 | Mankame et al. | |
| 2006/0186700 A1 | 8/2006 | Browne et al. | |
| 2007/0034818 A1 * | 2/2007 | Grummon | C23C 14/205 251/129.01 |
| 2008/0079222 A1 | 4/2008 | Namuduri et al. | |
| 2008/0120911 A1 * | 5/2008 | Browne | E05B 47/0009 49/352 |
| 2008/0141736 A1 | 6/2008 | Jones et al. | |
| 2008/0217927 A1 | 9/2008 | Browne et al. | |
| 2009/0008844 A1 | 1/2009 | Browne et al. | |
| 2009/0223604 A1 | 9/2009 | Luntz et al. | |
| 2009/0226691 A1 | 9/2009 | Mankame et al. | |
| 2009/0241537 A1 * | 10/2009 | Browne | A45B 25/143 60/527 |
| 2009/0255187 A1 | 10/2009 | Alexander et al. | |
| 2009/0277170 A1 | 11/2009 | Gao et al. | |
| 2010/0012518 A1 | 1/2010 | Feldman et al. | |
| 2010/0092238 A1 | 4/2010 | Zavattieri et al. | |
| 2010/0236236 A1 | 9/2010 | Mankame et al. | |
| 2010/0237632 A1 | 9/2010 | Browne et al. | |
| 2010/0326070 A1 | 12/2010 | Hao et al. | |
| 2010/0332035 A1 | 12/2010 | Gao et al. | |
| 2010/0332151 A1 | 12/2010 | Hao et al. | |
| 2011/0048096 A1 | 3/2011 | Bradley et al. | |
| 2011/0094215 A1 | 4/2011 | Browne et al. | |
| 2011/0114434 A1 | 5/2011 | Mankame et al. | |
| 2011/0163769 A1 | 7/2011 | Herrera et al. | |
| 2011/0187054 A1 | 8/2011 | Namuduri et al. | |
| 2011/0258931 A1 | 10/2011 | Gao et al. | |
| 2011/0285618 A1 | 11/2011 | Browne et al. | |
| 2012/0046791 A1 | 2/2012 | Gao et al. | |
| 2012/0065744 A1 | 3/2012 | Brammajyosula et al. | |
| 2012/0109573 A1 | 5/2012 | Gao et al. | |
| 2012/0126551 A1 | 5/2012 | Alexander et al. | |
| 2012/0133175 A1 * | 5/2012 | Charnesky | B60J 10/40 296/146.4 |
| 2012/0174573 A1 | 7/2012 | Skurkis et al. | |
| 2012/0190573 A1 | 7/2012 | Gomperts et al. | |
| 2012/0310126 A1 * | 12/2012 | Bureau | A61F 5/05833 602/6 |
| 2013/0000206 A1 | 1/2013 | O'Kane et al. | |
| 2013/0042718 A1 | 2/2013 | Browne et al. | |
| 2013/0205770 A1 | 8/2013 | Browne et al. | |
| 2013/0239565 A1 | 9/2013 | Browne et al. | |
| 2013/0240096 A1 | 9/2013 | Browne et al. | |
| 2014/0225708 A1 | 8/2014 | Usoro | |
| 2014/0273790 A1 | 9/2014 | Alexander et al. | |
| 2014/0312647 A1 | 10/2014 | Wang | |
| 2015/0107233 A1 | 4/2015 | Ou et al. | |
| 2015/0343548 A1 | 12/2015 | Skurkis et al. | |
| 2015/0369325 A1 * | 12/2015 | Bureau | A61F 5/05833 428/35.4 |
| 2016/0313189 A1 | 10/2016 | Skurkis et al. | |
| 2016/0314918 A1 | 10/2016 | Skurkis et al. | |
| 2018/0179793 A1 | 6/2018 | Kim et al. | |
| 2018/0312046 A1 | 11/2018 | Hutchens, III et al. | |
| 2019/0106030 A1 | 4/2019 | Kim et al. | |

FOREIGN PATENT DOCUMENTS

| | | |
|---|---|---|
| CN | 109624809 A | 4/2019 |
| CN | 109629939 A | 4/2019 |
| DE | 3923725 A1 | 1/1991 |
| DE | 102018124658 A1 | 4/2019 |
| DE | 102018124792 A1 | 4/2019 |
| DE | 102018124797 A1 | 4/2019 |
| DE | 102018124921 A1 | 4/2019 |
| WO | WO-2009114357 A2 | 9/2009 |
| WO | 2016100182 A1 | 6/2016 |

OTHER PUBLICATIONS

Kim et al.; U.S. Appl. No. 15/728,059, filed Oct. 9, 2017 entitled "Removable Roof Panel for a Vehicle"; 26 pages.

(56) References Cited

OTHER PUBLICATIONS

Kim et al.; U.S. Appl. No. 15/728,072, filed Oct. 9, 2017 entitled "Hybrid Tonneau Cover"; 21 pages.

Kim, Yong-Jae et al., "A Novel Layer Jamming Mechanism With Tunable Stiffness Capability for Minimally Invasive Surgery," IEEE Transations on Robotics, vol. 29, No. 4, pp. 1031-1042 (Published Apr. 15, 2013).

Manti, Mariangela et al., "Stiffening in Soft Robotics: A Review of the State of the Art," IEEE Robotics & Automation Magazine, vol. 23 (3), pp. 93-106 (Published Sep. 13, 2016); DOI: 10.1109/MRA.2016.2582718.

Ou, Jifei et al., "JamSheets: Thin Interfaces with Tunable Stiffness Enabled by Layer Jamming," Conference: Proceedings of the 8th International Conference on Tangible, Embedded and Embodied Interaction (2014), pp. 65-72; DOI: 10.1145/2540930.2540971.

\* cited by examiner

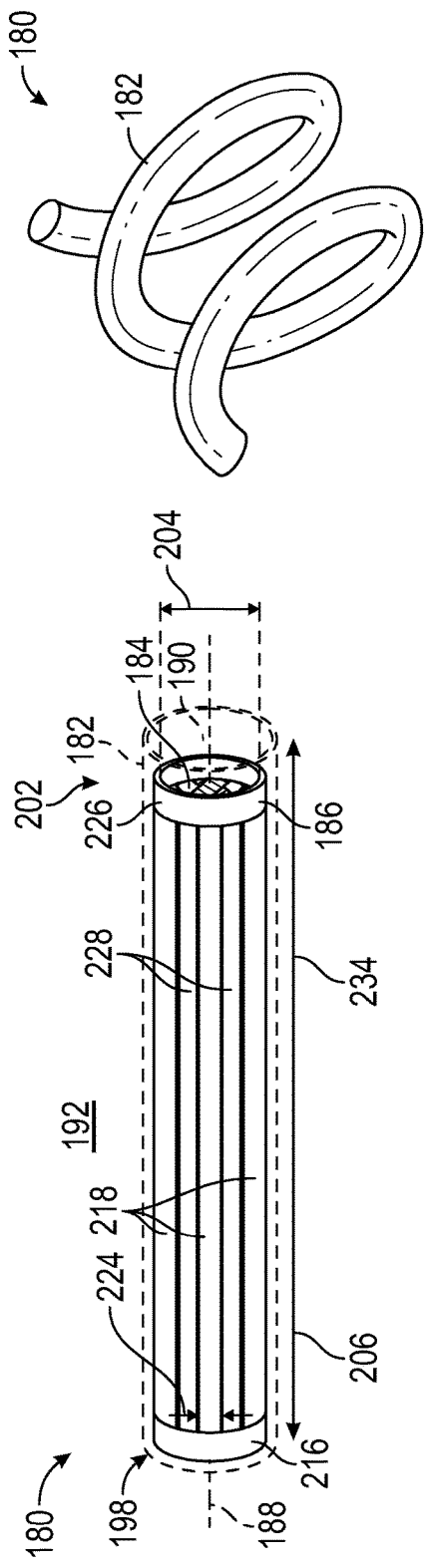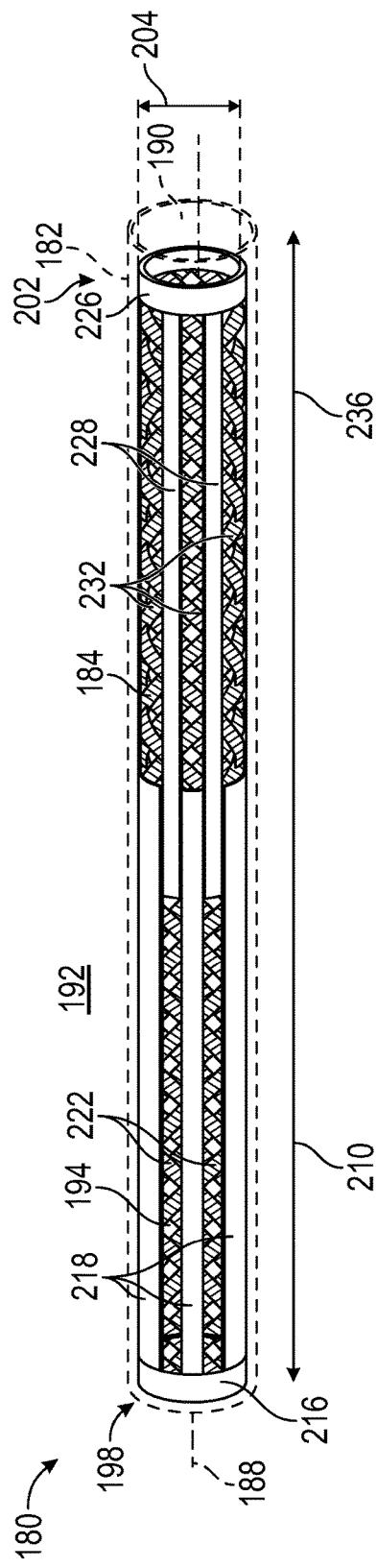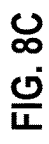

STRETCHABLE ADJUSTABLE-STIFFNESS ASSEMBLIES

CROSS REFERENCE TO RELATED APPLICATIONS

This application has related subject matter to the following applications: U.S. patent application Ser. No. 15/727,757 filed on Oct. 9, 2017 entitled "CONFORMABLE AND RECONFIGURABLE OCCUPANT SUPPORT STRUCTURE," U.S. patent application Ser. No. 15/728,059 filed on Oct. 9, 2017 entitled "REMOVABLE ROOF PANEL FOR A VEHICLE," and U.S. patent application Ser. No. 15/728,072 filed on Oct. 9, 2017 entitled "HYBRID TONNEAU COVER."

INTRODUCTION

The present disclosure relates to stretchable adjustable-stiffness assemblies.

This section provides background information related to the present disclosure which is not necessarily prior art.

Adjustable-stiffness assemblies are capable of being shifted between a relaxed configuration and a fixed configuration. Typically, in the relaxed configuration, the assemblies can be manipulated into different shapes, but remain constant in size. Adjustable-stiffness assemblies can be shifted from the relaxed configuration to the fixed configuration by lowering a pressure within a fluid-tight interior of the assembly below an exterior pressure outside of the assembly (i.e., atmospheric pressure). In the fixed configuration, at the reduced interior pressure, the shape of the assembly is locked.

SUMMARY

This section provides a general summary of the disclosure, and is not a comprehensive disclosure of its full scope or all of its features.

In various aspects, the present disclosure provides a stretchable adjustable-stiffness assembly. The stretchable adjustable-stiffness assembly includes a casing, a first friction layer, and a second friction layer. The casing can be fluidly sealed. The casing defines a first axis and includes an interior compartment containing a first fluid. The first fluid can shift between a first interior pressure and a second interior pressure that is less than both the first interior pressure and an exterior pressure external to the casing. The first friction layer is at least partially disposed within the interior compartment. The second friction layer is at least partially disposed within the interior compartment. The stretchable adjustable-stiffness assembly can shift between a relaxed configuration and a fixed configuration. In the relaxed configuration, the first fluid has the first interior pressure, the casing is stretchable along the first axis such that a casing length varies between a first dimension and a second dimension greater than the first dimension, and the stretchable adjustable-stiffness assembly has a first stiffness. In the fixed configuration, the first fluid has the second interior pressure, the casing length is fixed at greater than or equal to the first dimension and less than or equal to the second dimension, the first friction layer engages the second friction layer, and the stretchable adjustable-stiffness assembly has a second stiffness greater than the first stiffness.

In one aspect, the stretchable adjustable-stiffness assembly is flexible such that it can be at least one of bent, folded, curled, rolled, and twisted in the relaxed configuration.

In one aspect, in the relaxed configuration, the first friction layer and the second friction layer are in direct sliding contact.

In one aspect, at least one of the first friction layer and the second friction layer can translate along the first axis with respect to the other of the first friction layer and the second friction layer as the casing is stretched.

In one aspect, the stretchable adjustable-stiffness assembly is used in a component selected from the group consisting of: a cargo restraint, a travel limiter for a door, a window shade, a cover for a storage area, a partition, and combinations thereof.

In one aspect, the first friction layer and the second friction layer each include at least one sheet. The first friction layer is fixed to the casing at a first edge of the casing. The second friction layer is fixed to the casing at a second edge of the casing.

In one aspect, the casing defines a second axis that is substantially perpendicular to the first axis. In the relaxed configuration, the casing can be stretched along the second axis such that a casing width varies between a third dimension and a fourth dimension that is greater than the third dimension. In the fixed configuration, the casing width is fixed at greater than or equal to the third dimension and less than or equal to the fourth dimension.

In one aspect, the stretchable adjustable-stiffness assembly further includes an inflatable tube that is fixed to the casing and disposed substantially parallel to the first axis. The inflatable tube includes an interior cavity and being fluidly separated from the interior compartment. The interior cavity contains a second fluid at a cavity pressure. The cavity pressure can vary between a first cavity pressure and a second cavity pressure that is greater than the first cavity pressure. The inflatable tube can lengthen from a first length to a second length when the cavity pressure increases from the first cavity pressure to the second cavity pressure. The lengthening of the inflatable tube stretches the casing from the first dimension to the second dimension.

In one aspect, the stretchable adjustable-stiffness assembly further includes a fiber network layer. The fiber network layer is disposed between the first friction layer and the second friction layer. The fiber network layer is compressible and can vary between a first volume and a second volume less that is than the first volume as the first fluid varies between the first interior pressure and the second interior pressure. In the relaxed configuration, the fiber network layer has the first volume and in the fixed configuration the fiber network layer has the second volume, wherein. When the fiber network layer has the first volume, a first coefficient of static friction between the fiber network layer and the first friction layer has a first value and a second coefficient of static friction between the fiber network layer and the second friction layer has a second value. When the fiber network layer has the second volume, the first coefficient of static friction has a third value that is greater than the first value, and the second coefficient of static friction has a fourth value that is greater than the second value.

In one aspect, the casing has a shape of a tube. The first axis is a longitudinal axis of the tube. The first friction layer is disposed radially inside the second friction layer.

In one aspect, one of the first friction layer and the second friction layer includes a helically-wound braid. The helically-wound braid can shift between a retracted state and an extended state when the stretchable adjustable-stiffness assembly is in the relaxed configuration. In the retracted state, the helically-wound braid has a first diameter and a retracted length along the first axis. In the extended state, the helically-wound braid has a second diameter smaller than the first diameter and an extended length along the first axis. The extended length is greater than the retracted length.

In one aspect, the stretchable adjustable-stiffness assembly further includes a first planar support and a second planar support. The first planar support is disposed at least partially within the interior compartment. The first planar support includes a first surface. The first friction layer is disposed on the first surface. The second planar support is disposed at least partially within the interior compartment. The second planar support includes a second surface disposed toward the first surface of the first planar support. The second friction layer is disposed on the second surface. The casing has a shape of a tube. The first axis is a longitudinal axis of the tube. The first planar support and the second planar support are disposed at least partially within the tube and are substantially parallel to one another.

In one aspect, the present disclosure provides a door assembly including a body, a door, and a travel limiter. The body includes an orifice. The door is pivotally connected to the body. The door can move between a closed position to prevent access to the orifice and a fully open position to permit access to the orifice. The travel limiter includes the stretchable adjustable-stiffness assembly. A first end of the tube and one of the first planar support and the second planar support are connected to the body. A second end of the tube and the other of the first planar support and the second planar support are connected to the door. When the stretchable adjustable-stiffness assembly is in the relaxed configuration, the door is pivotable between the closed position and the fully open position. When the stretchable adjustable-stiffness assembly is in the fixed configuration, a position of the door is fixed with respect to the body.

In one aspect, in the closed position, the door forms a first angle with respect to the body. In the fully open position, the door forms a second angle with respect to the body. The door can be fixed at a lock angle greater than or equal to the first angle and less than or equal to the second angle.

In various aspects, the present disclosure provides an adjustable-stiffness assembly. The adjustable-stiffness assembly includes a casing, a first friction layer, a second friction layer, and a fiber network layer. The casing can be fluidly sealed. The casing includes an interior compartment containing a first fluid. The first fluid being can vary between a first interior pressure and a second interior pressure that is less than both the first interior pressure and an exterior pressure external to the casing. The first friction layer is at least partially disposed within the interior compartment. The second friction layer is at least partially disposed within the interior compartment. The fiber network layer disposed between the first friction layer and the second friction layer. The fiber network layer is compressible and can vary between a first volume and a second volume that is less than the first volume. When the fiber network layer has the first volume, a first coefficient of static friction between the fiber network layer and the first friction layer has a first value and a second coefficient of static friction between the fiber network layer and the second friction layer has a second value. When the fiber network layer has the second volume, the first coefficient of static friction has a third value that is greater than the first value, and the second coefficient of static friction has a fourth value that is greater than the second value. The adjustable-stiffness assembly can shift between a relaxed configuration and a fixed configuration. In the relaxed configuration, the first fluid has the first interior pressure, the fiber network layer has the first volume, the adjustable-stiffness assembly can be at least one of stretched, bent, folded curled, rolled, and twisted into an adjustable-stiffness assembly shape, and the adjustable-stiffness assembly has a first stiffness. In the fixed configuration, the first fluid has the second interior pressure, the fiber network layer has the second volume, the adjustable-stiffness assembly shape is fixed, and the adjustable-stiffness assembly has a second stiffness greater than the first stiffness.

In one aspect, the first friction layer and the second friction layer each include at least one sheet. The first friction layer is fixed to the casing at a first edge of the casing. The second friction layer is fixed to the casing at a second edge.

In one aspect, the casing has a shape of a tube. The first friction layer is disposed inside the second friction layer.

In various aspects, the present disclosure provides an adjustable-stiffness assembly. The adjustable-stiffness assembly includes a housing, a first friction layer, and a second friction layer. The housing includes an interior compartment. The first friction layer is at least partially disposed within the housing. The second friction layer is at least partially disposed within the housing and can engage the first friction layer. The adjustable-stiffness assembly can shift between a relaxed configuration and a fixed configuration. At least one of the first friction layer and the second friction layer includes an inflatable bladder containing a fluid. The fluid can vary between a first bladder pressure and a second bladder pressure that is greater than both the first bladder pressure and an exterior pressure outside of the inflatable bladder. In the relaxed configuration, the fluid has the first bladder pressure, the adjustable-stiffness assembly can be at least one of stretched, bent, folded, curled, rolled, and twisted into an assembly shape, and the adjustable-stiffness assembly has a first stiffness. In the fixed configuration, the fluid has the second bladder pressure, the first friction layer engages the second friction layer, the adjustable-stiffness assembly shape is fixed, and the adjustable-stiffness assembly has a second stiffness greater than the first stiffness.

In one aspect, the first friction layer includes a first inflatable bladder and the second friction layer includes a second inflatable bladder.

In one aspect, the first friction layer includes the inflatable bladder and the second friction layer includes a non-inflatable material.

In one aspect, the housing defines a first axis. In the relaxed configuration, the housing can be stretchable along the first axis of the housing such that a housing length varies between a first dimension and a second dimension that is greater than the first dimension. In the fixed configuration, the housing length is fixed at greater than or equal to the first dimension and less than or equal to the second dimension.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2A:
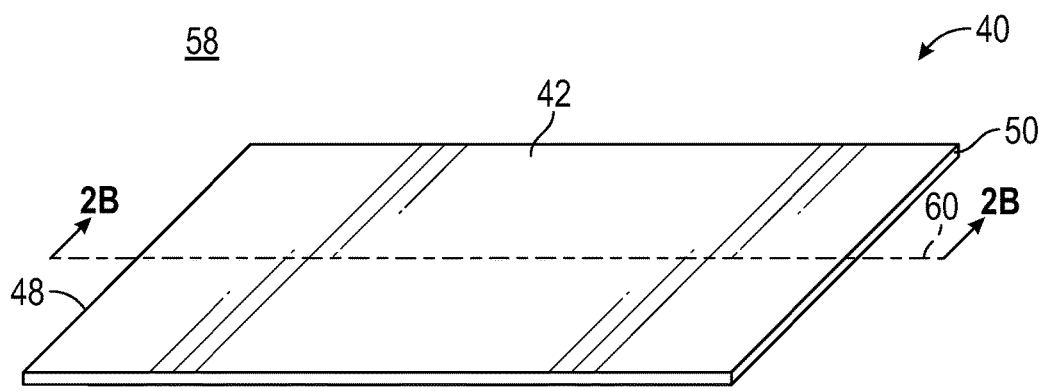
Figure 2B:
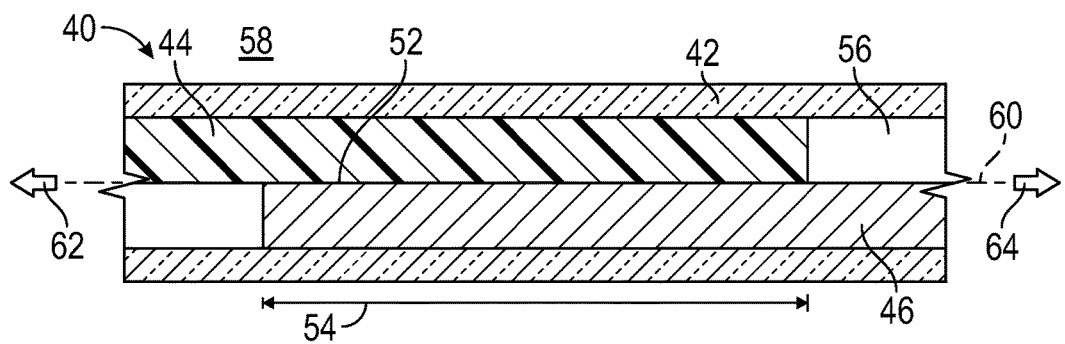
Figure 3A:
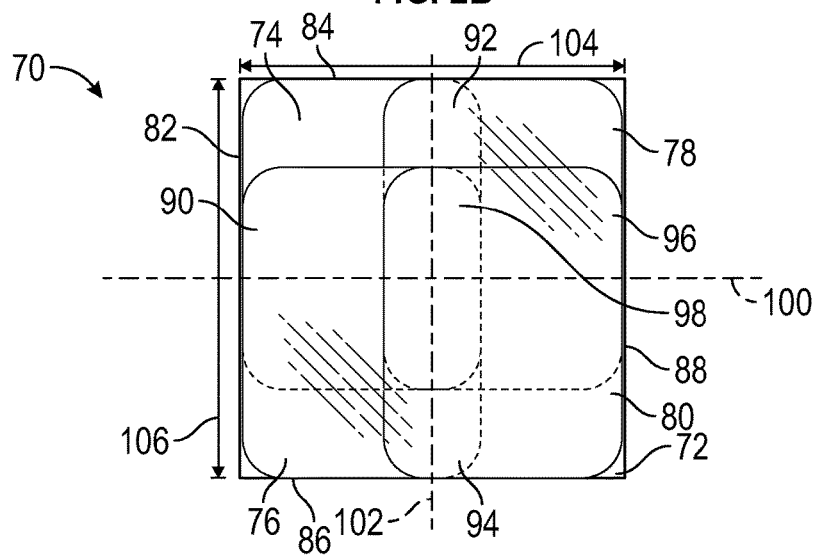
Figure 3B:
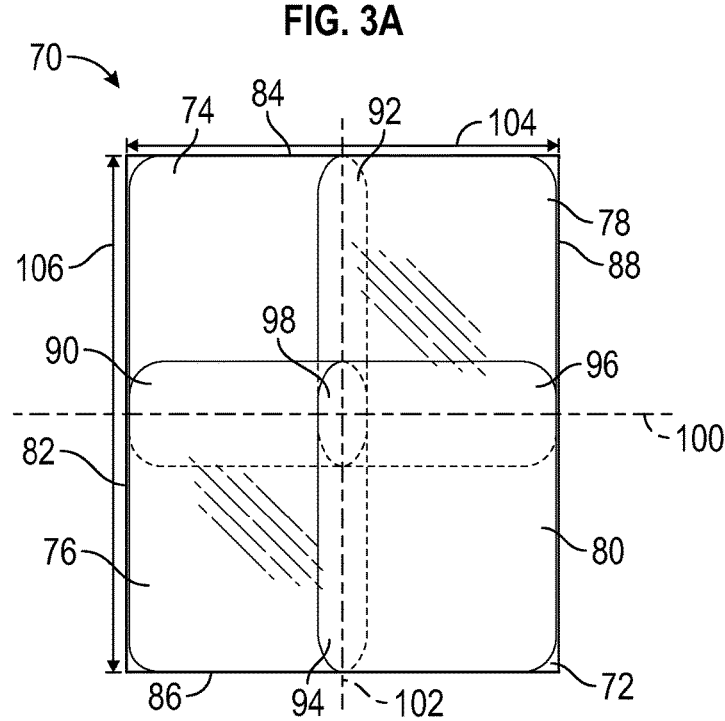
Figure 3C:
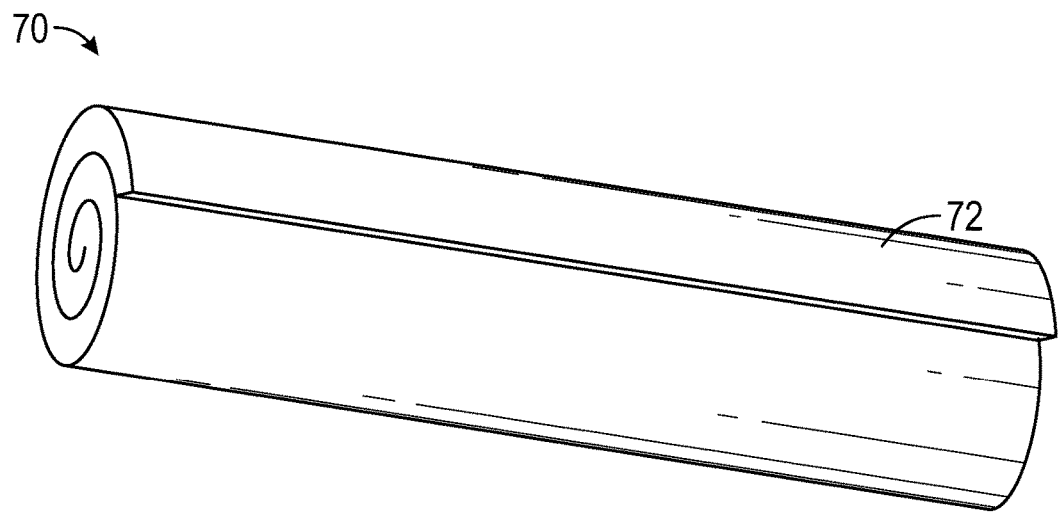
Figure 4A:
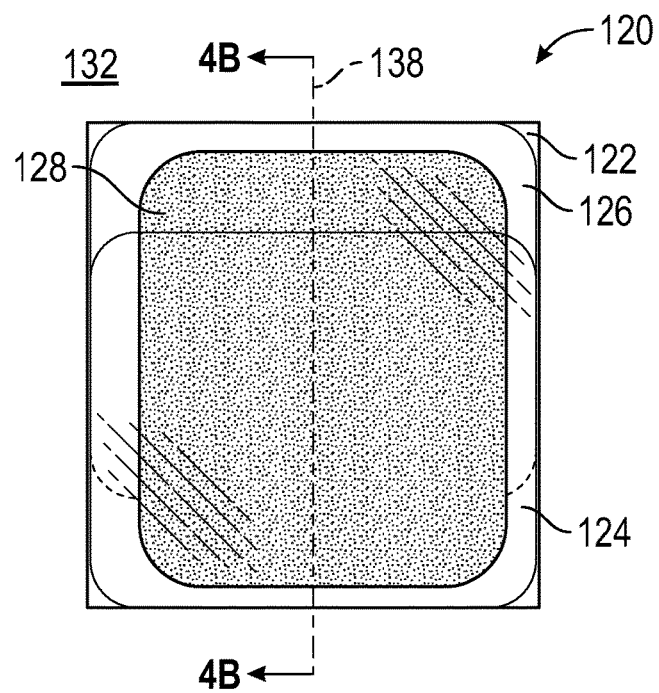
Figure 4B:
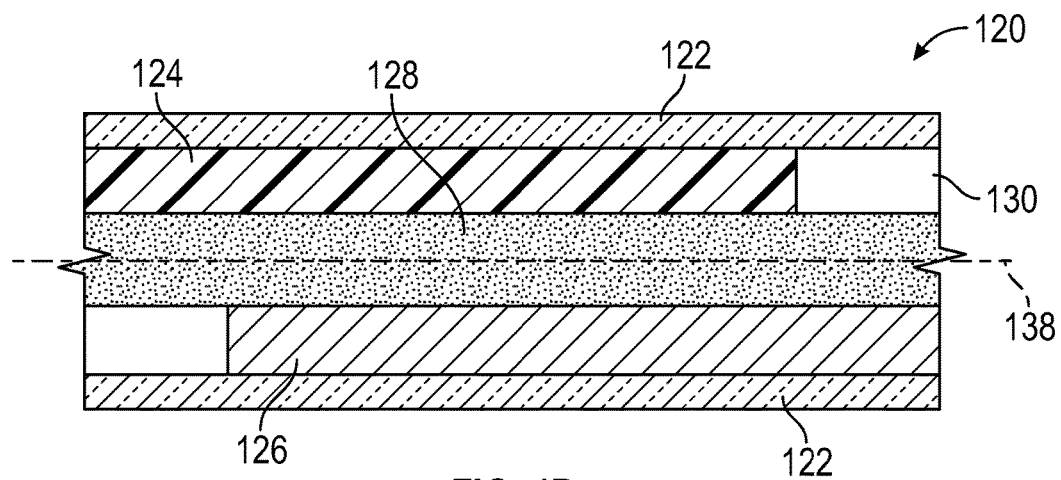
Figure 5A:
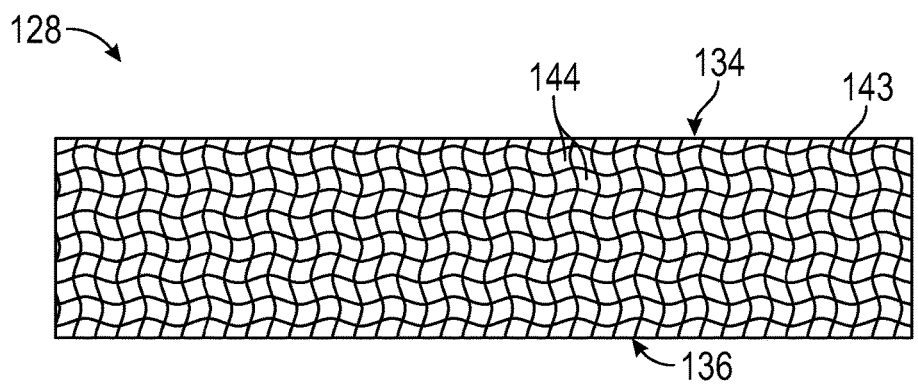
Figure 5B:
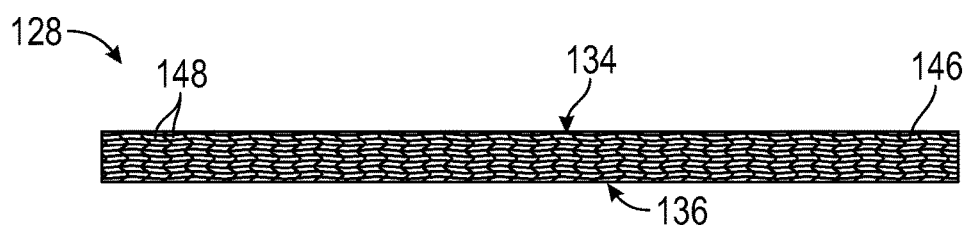
Figure 6A:
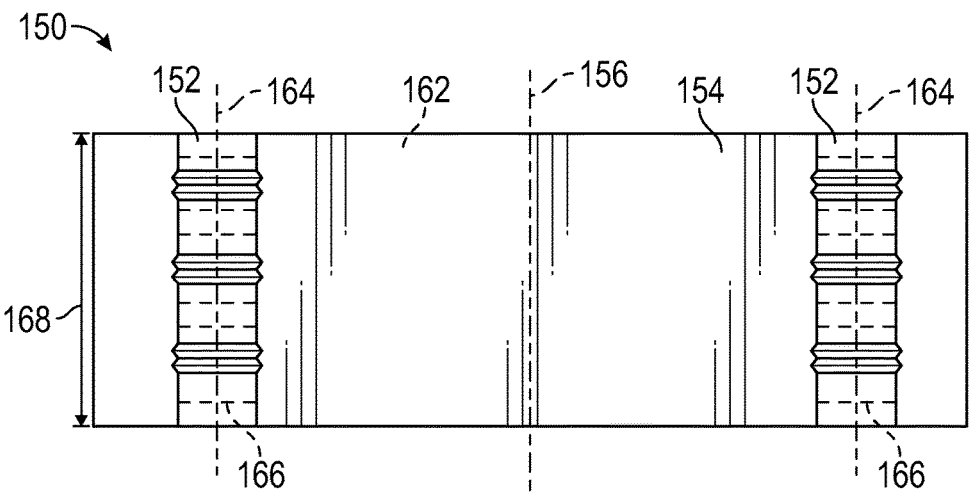
Figure 6B:
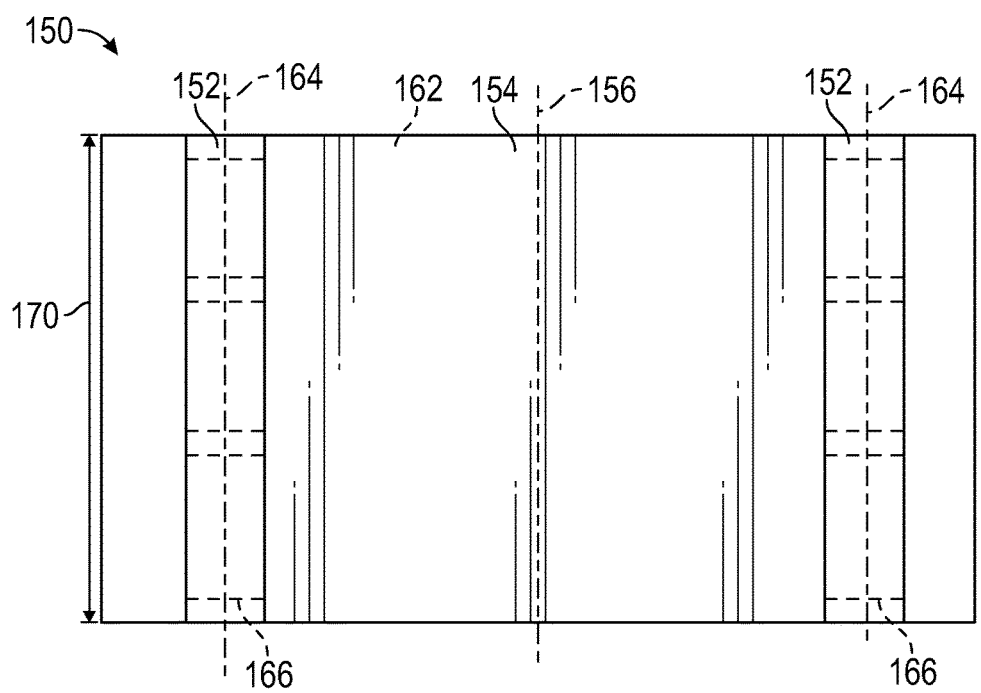
Figure 7A:
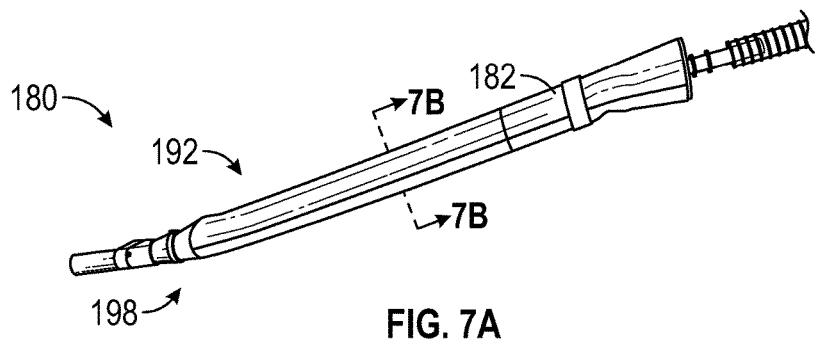
Figure 7B:
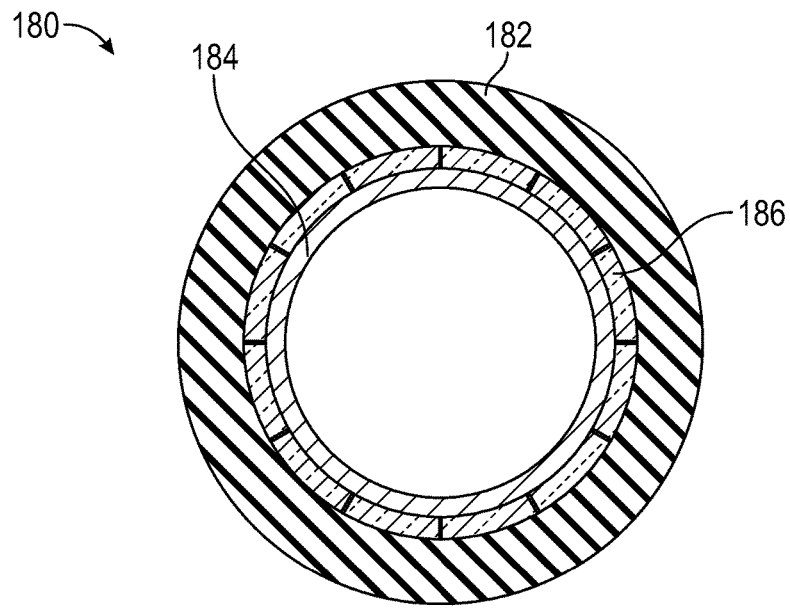
Figure 7C:
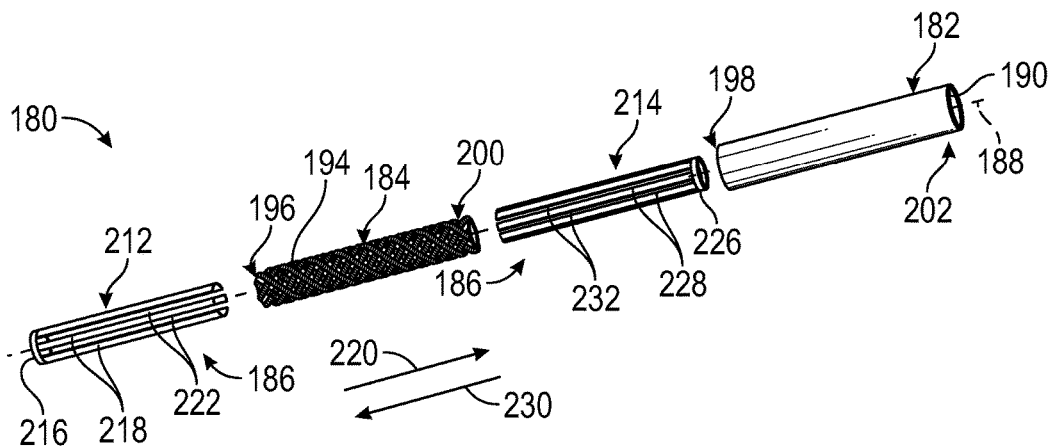
Figure 9:
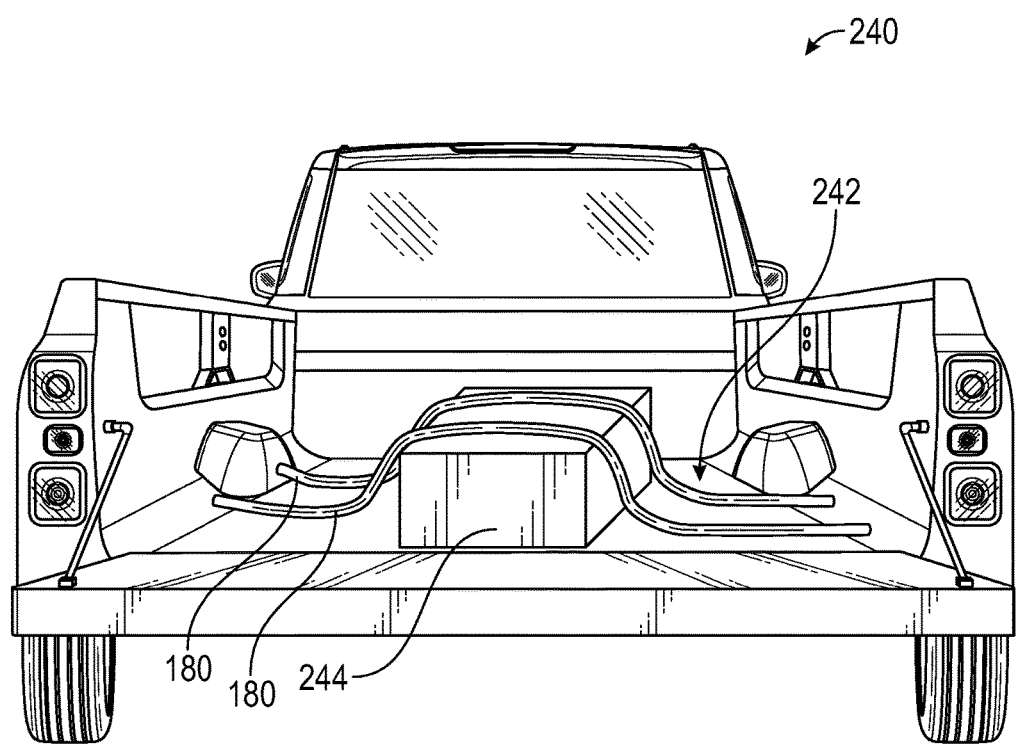
Figure 10A:
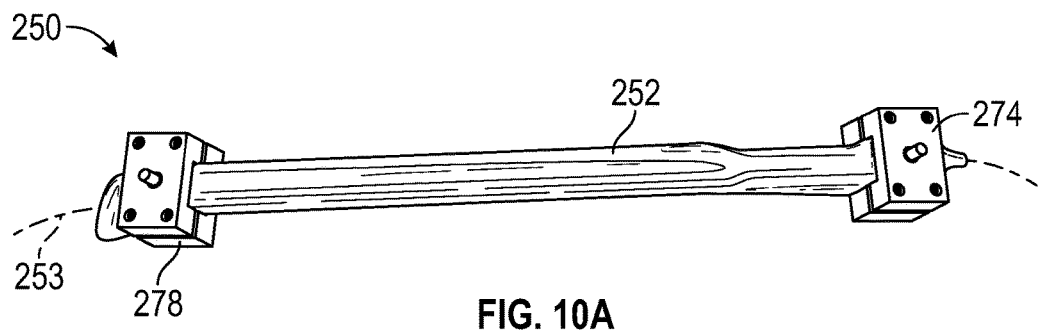
Figure 10B:
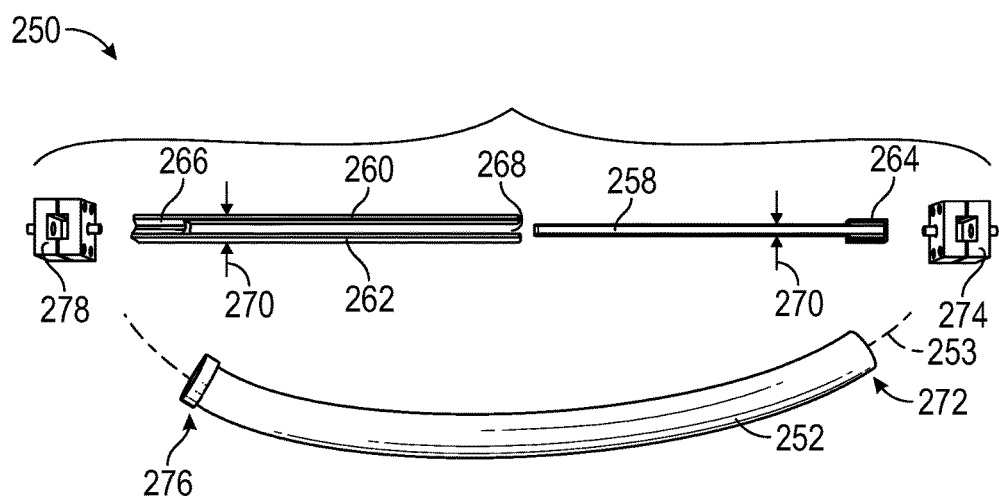
Figure 10C:
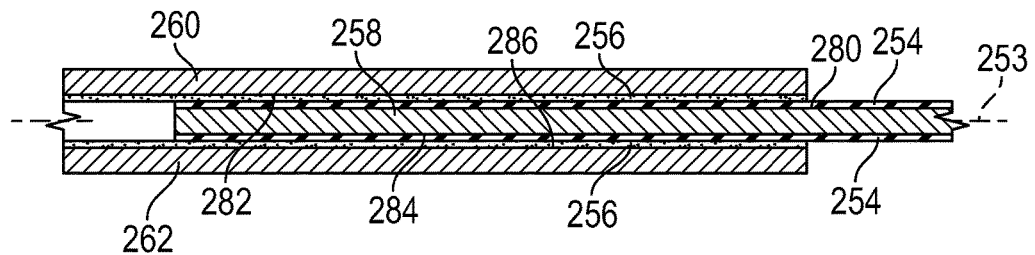
Figure 10D:
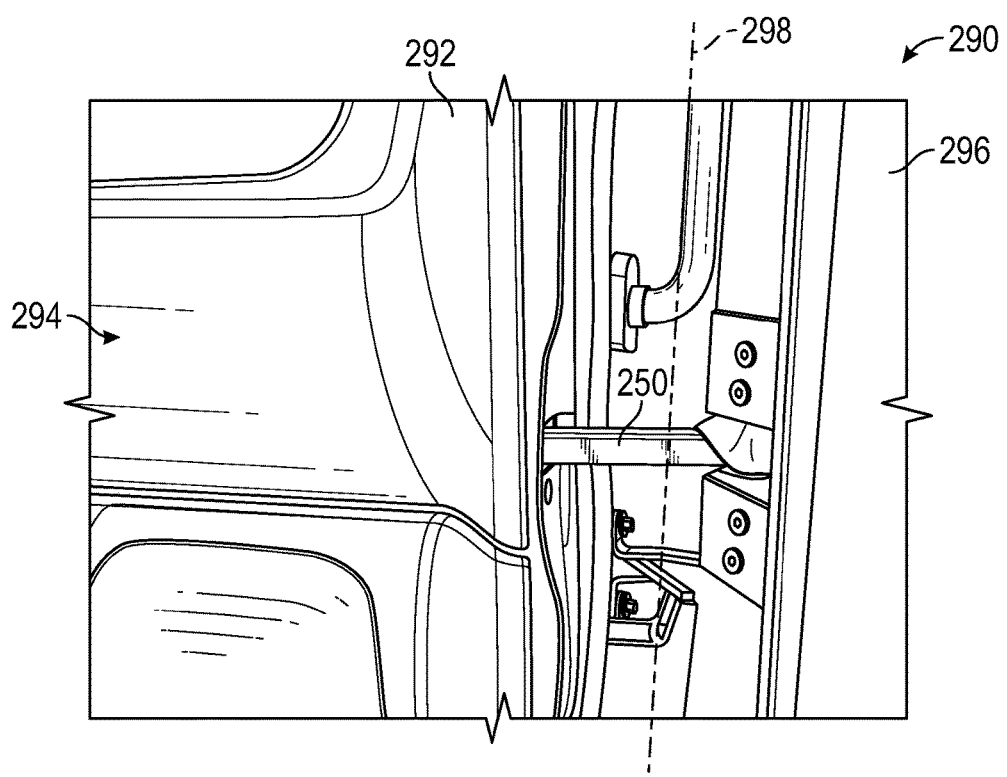
Figure 11A:
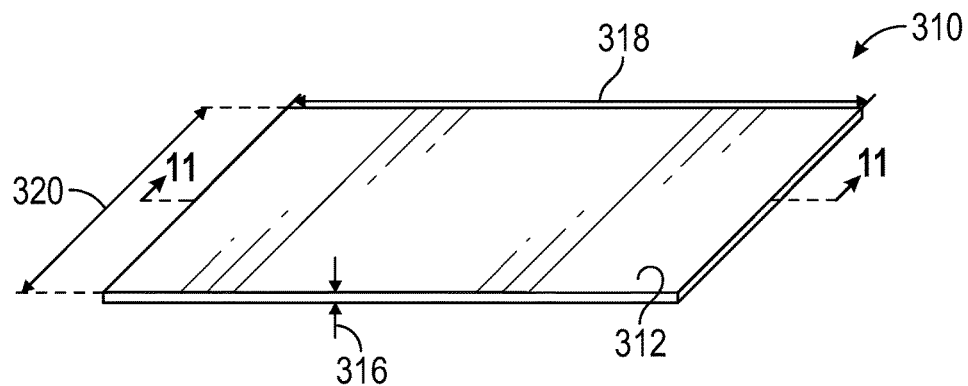
Figure 11B:
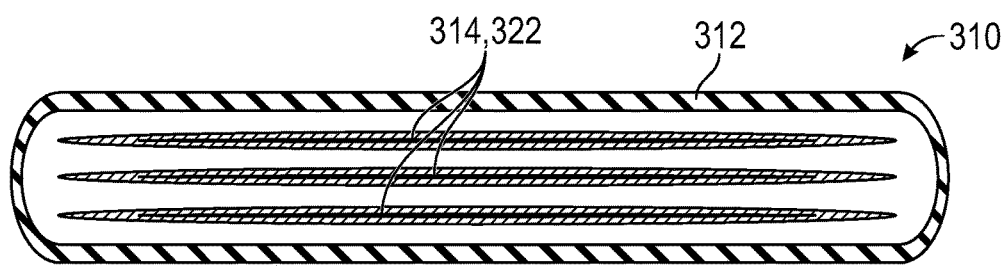
Figure 11C:
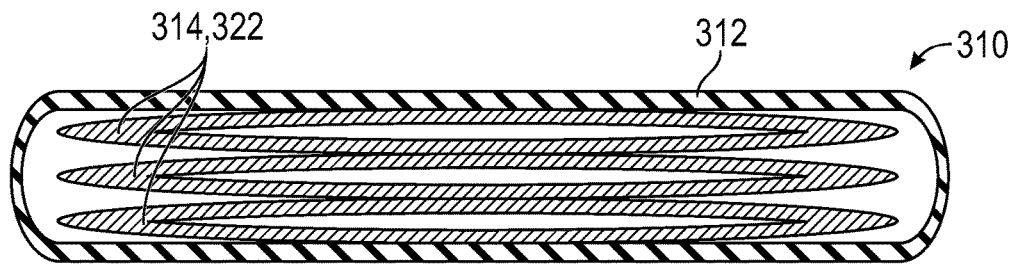
Figure 12A:
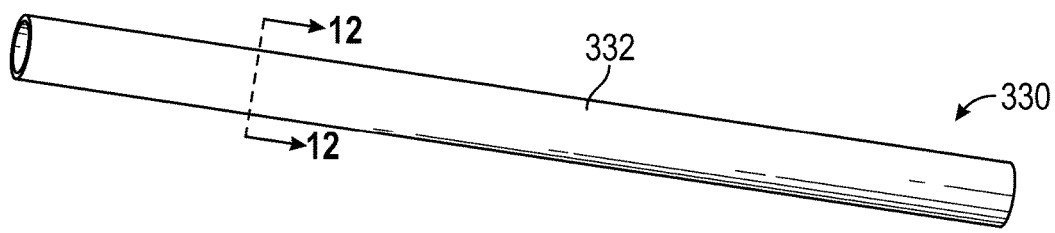
Figure 12B:
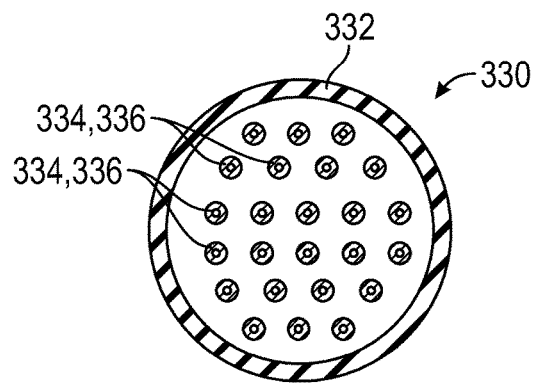
Figure 12C:
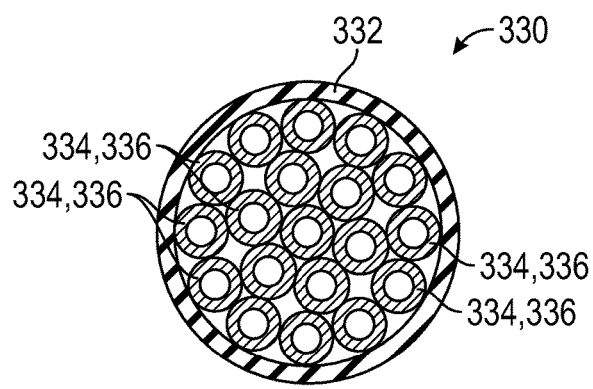
Figure 13A:
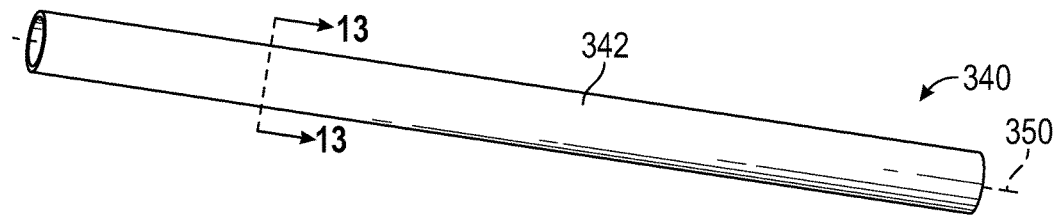
Figure 13B:
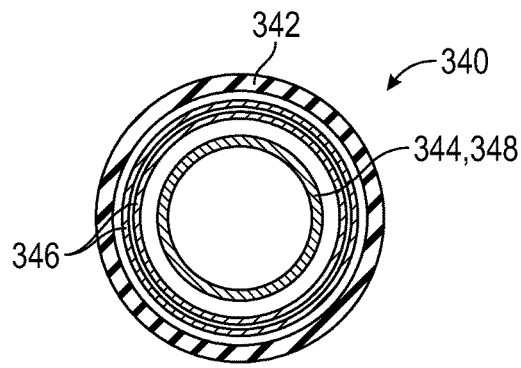
Figure 13C:
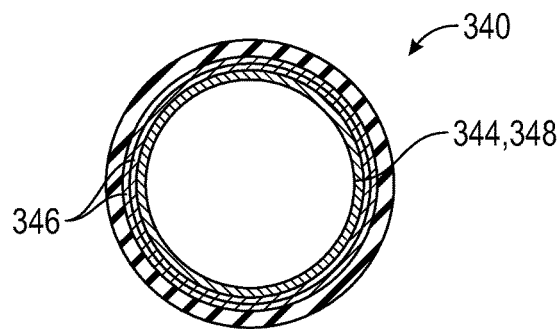
Figure 14A:
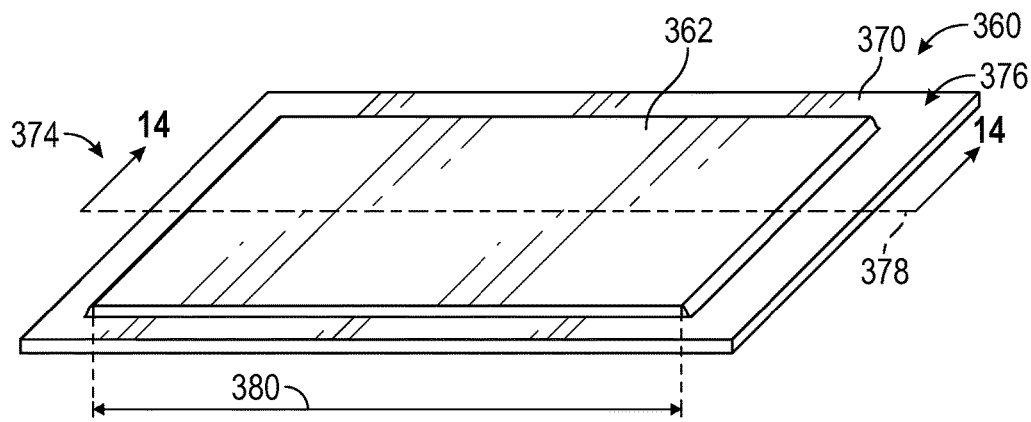
Figure 14B:
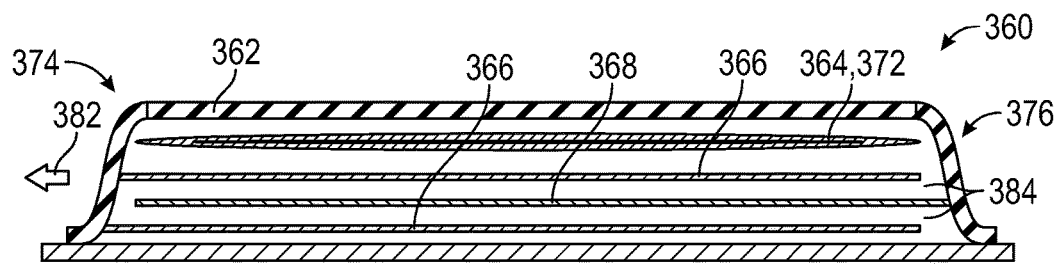
Figure 14C:
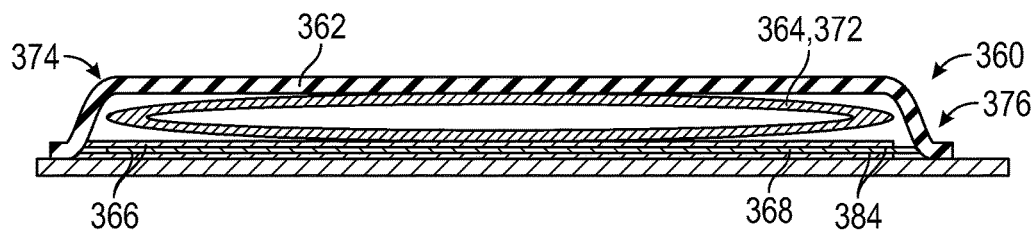
Figure 15A:
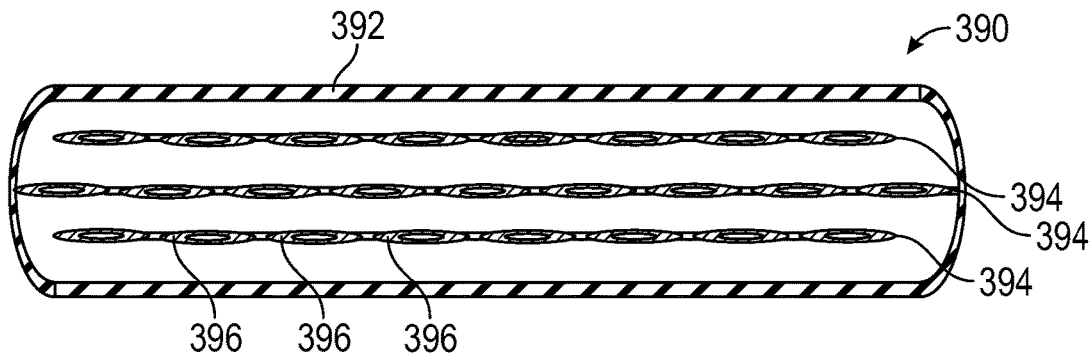
Figure 15B:
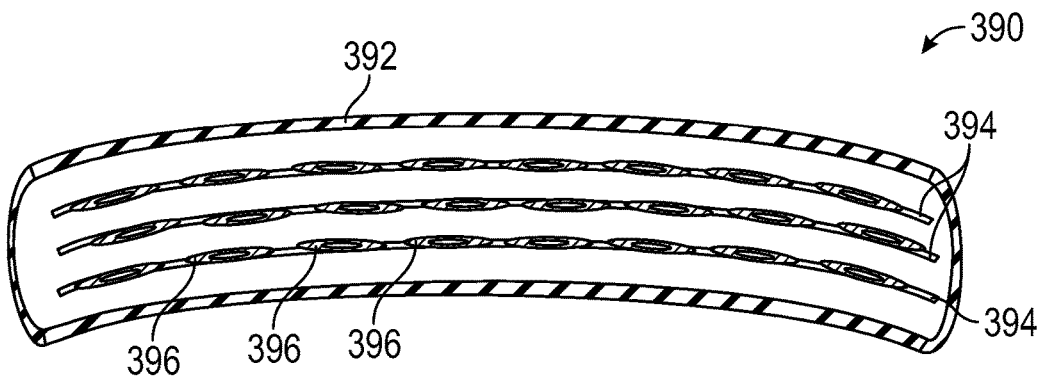
Figure 15C:
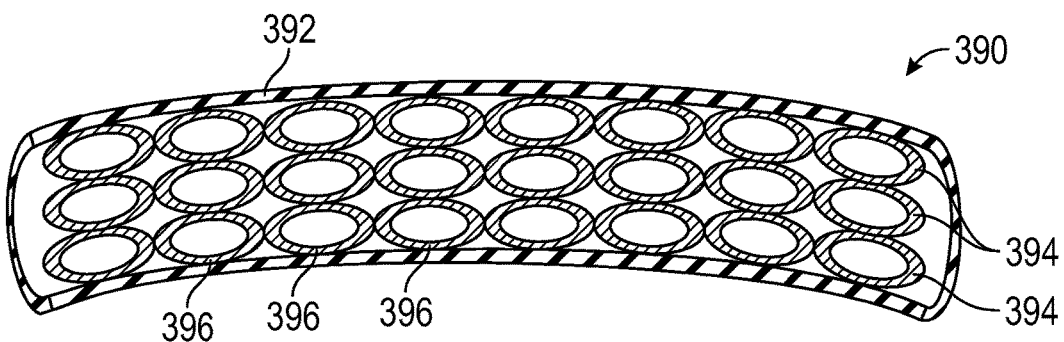

FIG. 1 is schematic view of a stretchable adjustable-stiffness assembly according to certain aspects of the present disclosure;

FIGS. 2A-2B show a stretchable adjustable-stiffness assembly according to certain aspects of the present disclosure. FIG. 2A is an isometric view; FIG. 2B is a partial sectional view taken at line 2B-2B of FIG. 2A;

FIGS. 3A-3C show another stretchable adjustable-stiffness assembly according to certain aspects of the present disclosure. FIG. 3A is a top view of the assembly in an unstretched; FIG. 3B is a top view of the assembly in a stretched state; FIG. 3C is an isometric view of the assembly in a rolled state;

FIGS. 4A-4B show an adjustable-stiffness assembly according to certain aspects of the present disclosure. FIG. 4A is a top view of the assembly; FIG. 4B is a partial sectional view of the assembly taken at line 4B-4B of FIG. 4A;

FIGS. 5A-5B are side views of a fiber network layer of the adjustable-stiffness assembly of FIGS. 4A-4B. FIG. 5A shows the fiber network layer in an uncompressed state; FIG. 5B shows the fiber network layer in a compressed state;

FIGS. 6A-6B are top views of yet another stretchable adjustable-stiffness assembly according to certain aspects of the present disclosure. FIG. 6A shows the assembly in an unstretched state; FIG. 6B shows the assembly in a stretched state;

FIGS. 7A-7C show another stretchable adjustable-stiffness assembly according to certain aspects of the present disclosure. FIG. 7A is an isometric view of the assembly; FIG. 7B is a sectional view of the assembly taken at line 7B-7B of FIG. 7A; FIG. 7C is an exploded isometric view of the assembly;

FIGS. 8A-8C show the stretchable adjustable-stiffness assembly of FIGS. 7A-7C. FIG. 8A is an isometric view of the assembly at a first length; FIG. 8B is an isometric view of the assembly at a second length; FIG. 8C is an isometric view of the assembly twisted into a helical configuration;

FIG. 9 is back isometric view of a truck including the stretchable adjustable-stiffness assembly of FIGS. 7A-7C;

FIGS. 10A-10D show another stretchable adjustable-stiffness assembly according to certain aspects of the present disclosure; FIG. 10A is an isometric view of the assembly; FIG. 10B is an exploded isometric view of the assembly; FIG. 10C is a partial sectional view of planar members and friction layers of the assembly of FIG. 10A; FIG. 10D is an isometric view of a vehicle door assembly including the assembly of FIG. 10A;

FIGS. 11A-11C show another adjustable-stiffness assembly according to certain aspects of the present disclosure. FIG. 11A is an isometric view of the assembly; FIG. 11B is a sectional view of the assembly taken at line 11-11 of FIG. 11A, shown in a relaxed configuration; FIG. 11C is a sectional view of the assembly, shown in a fixed configuration;

FIGS. 12A-12C show an adjustable-stiffness assembly according to certain aspects of the present disclosure. FIG. 12A is an isometric view of the assembly; FIG. 12B is a sectional view of the assembly taken at line 12-12 of FIG. 12A, shown in a relaxed configuration; FIG. 12C is a sectional view of the assembly, shown in a fixed configuration;

FIGS. 13A-13C show another adjustable-stiffness assembly according to certain aspects of the present disclosure. FIG. 13A is an isometric view of the assembly; FIG. 13B is a sectional view of the assembly taken at line 13-13 of FIG. 13A, shown in a relaxed configuration; FIG. 13C is a sectional view of the assembly, shown in a fixed configuration;

FIGS. 14A-14C show yet another adjustable-stiffness assembly according to certain aspects of the present disclosure. FIG. 14A is an isometric view of the assembly; FIG. 14B is a sectional view of the assembly taken at line 14-14 of FIG. 14A, shown in a relaxed configuration; FIG. 14C is a sectional view of the assembly, shown in a fixed configuration;

FIGS. 15A-15C are sectional views of yet another adjustable-stiffness assembly according to certain aspects of the present disclosure. FIG. 15A is a shows the assembly in a relaxed configuration; and FIG. 15B shows the assembly in the relaxed configuration and in a deformed state; FIG. 15C shows the assembly in a fixed configuration.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

With reference to FIG. 1, a stretchable adjustable-stiffness assembly 10 according to certain aspects of the present disclosure is provided. The assembly 10 includes a first friction layer 12 and a second friction layer 14. The second friction layer 14 partially overlaps the first friction layer 12 at an interface 16. The interface 16 has a first dimension or length 18 and a second dimension or width 20. The first and second friction layers 12, 14 are capable of sliding with respect to one another. For example, the first friction layer 12 may be translated in a first direction 24 and the second friction layer 14 may be translated in a second direction 26 opposite the first direction.

The first and second friction layers 12, 14 are surrounded by a fluid-tight envelope or casing 22. A pressure differential represents the difference between an external pressure 28 outside the casing 22 and an internal pressure 30 within the casing 22. In some embodiments, the internal pressure 30 may be less than the exterior pressure, resulting in a negative pressure differential or suction. Pressures are typically measured by gauge pressure, which is the pressure above or below ambient atmospheric pressure. The atmospheric pressure that indicates as zero on ordinary pressure gauges is 760 torr, which is normal pressure at sea level. Negative pressure is therefore, defined as pressure less than atmospheric pressure. In some embodiments, the external pressure 28 is atmospheric pressure.

The assembly 10 can transition between a relaxed or lower-stiffness configuration and a fixed or higher-stiffness configuration. In the relaxed configuration, the assembly 10, or portions of the assembly 10 such as the casing 22, may be flexible. Thus, in the relaxed configuration, the assembly 10 is capable of being stretched, bent, folded, curled, twisted, or rolled. In the fixed configuration, layer jamming is used to fix or lock the dimensions and shape of the assembly 10. Thus, in the fixed configuration, the assembly 10 cannot be stretched, bent, folded curled, rolled, or twisted.

Layer jamming involves increasing a stiffness of the assembly 10 by increasing a friction force between the first and second layers 12, 14. The friction force (F) is represented by equation (1)

$$F = \mu n P l w \qquad (1)$$

where F represents the friction force, μ represents the coefficient of static friction between the first and second layers 12, 14, n represents the quantity of interfaces between friction layers (e.g., one in FIG. 1), P represents the pressure differential between the external pressure and the internal pressure, l represents the length 18 of the interface 16, and w represents the width 20 of the interface 16. Thus, the friction force (F), and ultimately stiffness of the assembly 10, can be affected by changing any of μ, n, P, l, and w. In the relaxed configuration, the assembly 10 has a first stiffness. In the fixed configuration, the assembly 10 has a second stiffness greater than the first stiffness.

In one aspect, the present disclosure provides a stretchable adjustable-stiffness assembly having a casing and at least two friction layers disposed within the casing. In the relaxed configuration, the assembly can be stretched between a first dimension and a longer second dimension. As the assembly is stretched, the friction layers are pulled apart from one another so that the interface between the layers decreases in area. In the fixed configuration, an interior pressure inside the casing is decreased to create a negative pressure and layer jamming is used to retain the assembly at the second length. More specifically, the decrease in the interior pressure results in an increase in the pressure differential (P), thereby increasing the friction force (F) between the friction layers and ultimately resulting in the assembly having a higher stiffness in the fixed configuration than in the relaxed configuration.

In another aspect, the present disclosure provides an adjustable-stiffness assembly having a casing, at least two friction layers disposed within the casing, and a compressible fiber network layer disposed between the friction layers. When the fiber network layer is compressed, the coefficients of friction increase between the fiber network layer and the adjacent friction layers. In a relaxed configuration, the assembly can be deformed (e.g., bent, folded, curled, rolled, twisted). In the fixed configuration, an interior pressure of the casing is reduced and the fiber network layer is compressed. The decrease in the interior pressure results in an increase in the pressure differential (P) and the compression of the fiber network layer results in an increase in the coefficient of friction ($\mu$). The increased pressure differential (P) and coefficient of friction ($\mu$) result in an increased friction force (F). Thus, layer jamming is used to retain a shape of the assembly.

In yet another aspect, the present disclosure provides an adjustable-stiffness assembly having a housing and at least two friction layers disposed within the housing. At least one of the friction layers is an inflatable bladder. The inflatable bladder is used to apply a positive pressure directly to the friction layers (rather than the indirect application of a pressure through the negative pressure or vacuum discussed above). In the relaxed configuration, the assembly can be deformed (e.g., bent, folded, curled, rolled, twisted). In the fixed configuration, an interior pressure of the bladder is increased and layer jamming is used to retain a shape of the assembly.

Adjustable-stiffness assemblies according to certain aspects of the present disclosure may have a variety of geometries, such as cords and sheets, by way of non-limiting example. Adjustable-stiffness assemblies may be used in automotive applications, non-automotive vehicle applications, and non-vehicle applications (e.g., medical technology). Non-limiting examples of applications for a stretchable adjustable-stiffness cord include: cargo restraints and travel limiters (e.g., for a door or partition). Non-limiting examples of applications for a stretchable adjustable-stiffness sheet include: sun shades, partitions (e.g., for separating seats in a vehicle, an office environment, or a waiting room), and covers (e.g., for a vehicle storage area).

Referring to FIGS. 2A-2B, a stretchable adjustable-stiffness assembly 40 according to certain aspects of the present disclosure is provided. The assembly 40 can be shifted between a relaxed configuration and a fixed configuration. In the relaxed configuration, the assembly 40 is stretchable such that its length can be modified, and deformable such that it can be bent, folded, curled, rolled, or twisted, by way of non-limiting example. In the fixed configuration, a size and shape of the assembly retained, locked, or fixed.

The assembly 40 includes a bladder 42 (i.e., a casing), a first friction layer 44, and a second friction layer 46. The first and second friction layers 44, 46 may be one or more sheets. The first friction layer 44 may be fixed to the bladder 42 along a first edge 48 and the second friction layer 46 may be fixed to the bladder 42 along a second edge 50. The first and second friction layers 44, 46 may be directly connected to first and second edges 48, 50 of the bladder 42, respectively. Alternatively, the first and second friction layers 44, 46 may be indirectly connected to the first and second edges 48, 50 of the bladder 42, for example, through separate first and second end supports (not shown). In other embodiments, the first and second friction layers 44, 46 are fixed to the bladder 42 in a different manner. For example, if one or both of the first and second friction layers 44, 46 is stretchable (e.g., a sheet formed from braided stretchable strands), it may be fixed to the bladder 42 at both the first edge 48 and the second edge 50 so that it stretches along with the bladder 42.

The first and second friction layers 44, 46 may overlap at an interface 52 having a length (l) 54 and a width (w) (not shown). An overlap area at the interface 52 is the product of the length (l) 54 and the width (w). As discussed above, the friction force (F) is directly proportional to the length (l) and width (w) of the interface. Thus, the friction force (F) can be increased by increasing one or both of the length (l) and the width (w).

The bladder 42 may be stretchable and puncture resistant. The bladder 42 may have an interior compartment 56 that includes a fluid (i.e., a first fluid), such as air. The interior compartment 56 can be sealed so that it is fluid-tight. The fluid in the interior compartment 56 has an interior pressure and an exterior region 58 outside of the bladder 42 has an exterior pressure. By way of non-limiting example, the bladder 42 may be made of an elastic material such as a thermoset rubber or a thermoplastic elastomer (TPE).

In the relaxed configuration, the bladder 42 is stretchable along an axis 60 (i.e., a first axis) between a first dimension and a second dimension greater than the first dimension. By way of non-limiting example, a ratio between the second dimension and the first dimension may be greater than 1 and less than 2, optionally greater than or equal to about 1.1 and less than or equal to about 1.9, optionally, greater than or equal to about 1.2 and less than or equal to about 1.8, optionally greater than or equal to about 1.3 and less than or equal to about 1.7, optionally greater than or equal to about 1.4 and less than or equal to about 1.6, and optionally about 1.5.

The axis 60 may be substantially perpendicular to the first and second edges 48, 50. The first and second edges 48, 50 can be pulled apart along the axis 60 to stretch the bladder 42. As the first and second edges 48, 50 are pulled apart, the first and second friction layers 44, 46 are translated in opposite directions and the interface 52 decreases in area. More specifically, the first friction layer 44 translates in a first direction 62 parallel to the axis 60 and the second friction layer 46 translates in a second direction 64 parallel to the axis 60 and opposite the first direction 62.

In addition to being stretchable, the assembly 40 may also be deformable in the relaxed configuration. In one example, the assembly 40 is deformed by bending (e.g., creating a sharp bend having an angle of greater than 0° and less than 180°). In another example, the assembly 40 is deformed by folding (e.g., creating a sharp bend of about 180° so that a surface the bladder 42 lies on top of itself). In yet another example, the assembly 40 is deformed by curling (e.g., creating a curved profile). In still another example, the assembly 40 is deformed by rolling (see, e.g., FIG. 3C). In still another example, the assembly 40 is deformed by twisting (e.g., creating a helical shape by rotating the first edge 48 clockwise about the axis 60 and rotating the second edge 50 counterclockwise about the axis 60). The assembly 40 may be deformed by one or more of the actions described above, or in various other ways.

When a desired size (resulting from stretching) and shape (resulting in deforming) are achieved, the assembly 40 can be placed in the fixed configuration. To place the assembly 40 in the fixed configuration, the interior pressure is reduced from a first interior pressure to a second interior pressure. In one example, the first interior pressure may be substantially the same as the exterior pressure, and the second interior pressure may be less than both the interior pressure and the exterior pressure. In some embodiments, the pressure differential (P) may be may be greater than or equal to about 100 torr and less than or equal to about 380 torr, optionally may be greater than or equal to about 125 torr and less than or equal to about 360 torr, optionally may be greater than or equal to about 150 torr and less than or equal to about 340 torr, optionally may be greater than or equal to about 175 torr and less than or equal to about 320 torr, optionally may be greater than or equal to about 200 torr and less than or equal to about 300 torr, optionally may be greater than or equal to about 225 torr and less than or equal to about 275 torr, optionally about 250 torr.

As the interior pressure is decreased, the first friction layer 44 engages the second friction layer 46, thereby increasing the friction force (F) between the first and second friction layers 44, 46. Thus, the stiffness of the assembly 40 is increased in the fixed configuration compared to the relaxed configuration. As a result of the higher stiffness, the assembly 40 is retained at a length that is greater than or equal to the first dimension and less than or equal to the second dimension and/or in the deformed shape. The assembly 40 can be returned to the relaxed configuration by increasing the interior pressure until the friction force is low enough for the first and second friction layers 44, 46 to slide with respect to one another and for the shape to be manipulated. For example, the interior pressure may be increased from the second interior pressure to the first interior pressure. The bladder 42 may also have elastic properties that assist in returning the assembly 40 to the relaxed configuration.

Although the quantity of friction layer interfaces (n) in the assembly 40 is depicted as one (i.e., first and second friction layers 44, 46), other quantities of friction layer interfaces (n) are contemplated within the scope of the present disclosure. By way of non-limiting example, the assembly 40 may include six friction layers to create five friction layer interfaces (n): three first friction layers 44 connected to the bladder 42 along the first edge 48 alternatingly stacked with three second friction layers 46 connected to the bladder 42 along the second edge 50. Indeed, as discussed above, an increase in the quantity of friction layer interfaces (n) increases the friction force (F) and ultimately the stiffness of the assembly 40.

The first and second friction layers 44, 46 may be the same material or different materials. Non-limiting examples of friction layers include: sandpaper (or other coated abrasive sheets), polymeric materials such as plastic and rubber. In some embodiments, the two friction layers may be woven together or braided to appear as a single "layer." In some embodiments, the friction layers may be attached to other components. For example, a friction layer may include sandpaper adhered to a rigid plastic layer. An abrasive side of the sandpaper would be disposed toward the other friction layer and the plastic layer would provide structural support. Those of skill in the art will readily appreciate that the composition of the friction layers is not limited to the materials listed above. The selection of friction layers impacts the coefficient of friction ($\beta$) between the friction layers, and ultimately the friction force (F). Thus, materials for friction layers can be selected to increase the friction force (F) and ultimately the stiffness of the assembly 40.

While the bladder 42, the first friction layer 44, and the second friction layer 46 are all shown as being substantially rectangular, other shapes are contemplated within the present disclosure. The bladder 42 shape may be selected based on the particular application. For example, when the assembly 40 is used as a sun shade for a window, the bladder 42 may have geometry to match the window. Similarly, the first and second edges 48, 50 of the bladder 42 need not be parallel. The shapes of the first and second frictions layers 44, 46 may be selected so that the length (l) and width (w) of the interface 52 are high enough to provide a sufficient friction force (F). Various shapes that meet the above characteristic may be used for the friction layers 44, 46.

With reference to FIGS. 3A-3C, another stretchable adjustable-stiffness assembly 70 is provided. The assembly 70 may be similar to the assembly 40 of FIGS. 2A-2B; however, it includes four friction layers and is stretchable along two distinct axes. FIG. 3A shows the assembly 70 in an unstretched state and FIG. 3B shows the assembly in a stretched state. The assembly 70 includes a bladder 72, a first friction layer 74, a second friction layer 76, a third friction layer 78, and a fourth friction layer 80. The first, second, third, and fourth friction layers 74, 76, 78, 80 may be similar to the first and second friction layers 44, 46 of assembly 40 of FIGS. 2A-2B.

Each of the first, second, third, and fourth friction layers 74, 76, 78, 80 is a sheet. The first friction layer 74 may be attached to the bladder 72 along a first edge 82 of the bladder 72 and a second edge 84 of the bladder 72. The second friction layer 76 may be attached to the bladder 72 along the first edge 82 and a third edge 86 of the bladder 72. The third edge 86 may be substantially parallel to the second edge 84. The third friction layer 86 may be attached to the bladder 72 along the second edge 84 and a fourth edge 88 of the bladder 72. The fourth edge 88 may be substantially parallel to the first edge 82. The fourth friction layer 80 may be attached to the bladder 72 at the third edge 86 and the fourth edge 88. While the friction layers 74, 76, 78, 80 are shown as rectangular a person having skill in the art would understand that they may be other shapes and sizes, similar to the friction layers 44, 46 of assembly 40 of FIGS. 2A-2B. Moreover, the friction layers 74, 76, 78, 80 may also have different shapes and sizes from one another. Thus, the first and fourth edges 82, 88 need not be parallel and the second and third 84, 86 edges need not be parallel.

The first and second friction layers 74, 76 may overlap one another and be in direct contact at a first interface 90. The first and third friction layers 74, 78 may overlap one another and be in direct contact at a second interface 92. The second and fourth friction layers 84, 88 may overlap one another and be in direct contact at a third interface 94. The third and fourth interface layers 78, 80 may overlap one another and be in direct contact at a fourth interface 96. The first, second, third, and fourth friction layers 74, 76, 78, 80 may overlap one another at a fifth interface 98.

The assembly 70 may include a first axis 100 and a second axis 102 substantially perpendicular to the first axis 100. The bladder 72 may be similar to the bladder 72 of FIGS. 2A-2B, except that the bladder 72 is stretchable along at least two axes. In the relaxed configuration, the bladder 72 may be stretchable along both the first axis 100 and the second axis 102. Thus, the first and fourth edges 82, 88 can be moved apart from one another along the first axis 100 to increase a length 104 of the assembly 70 from a first dimension to a second dimension greater than the first dimension. The second and third edges 84, 86 can be moved apart from one another along the second axis 102 to increase a width 106 of the assembly 70 from a third dimension to a fourth dimension greater than the third dimension.

The assembly 70 can be deformed in a similar manner as described above with respect to FIGS. 2A-2B. For example, referring to FIG. 3C, the assembly 70 is shown in a rolled configuration. The assembly 70 can be shifted between the relaxed configuration and the fixed configuration in a similar manner as the assembly 40 of FIGS. 2A-2B, as described above. Although the assembly 70 is shown and described with four friction layers, it may have fewer than four friction layers and still be operable to stretch along both the first and second axes 100, 102.

Returning to FIGS. 2A-2B, where the first and second friction layers 44, 46 are in direct contact, the assembly 40 may be difficult to restore to the relaxed configuration if the coefficient of friction (μ) between the layers 44, 46 is high. In some embodiments, the reduction in pressure differential (P) alone may be insufficient to disengage the first friction layer 44 from the second friction layer 46 to manipulate the first and second friction layers 44, 46 (e.g., slide the friction layers 44, 46 toward one another along the axis 60, or flatten the assembly 40 from a folded or rolled shape).

Referring to FIGS. 4A-5B, an adjustable-stiffness assembly 120 having an adjustable coefficient of friction (μ) is provided. The assembly 120 can be shifted between a relaxed configuration and a fixed configuration. The assembly 120 may include a bladder 122, a first friction layer 124, a second friction layer 126, and a compressible fiber network layer 128. The first and second friction layers 124, 126 may be similar to the first and second friction layers 44, 46 of assembly 40 of FIGS. 2A-2B.

The bladder 122 has an interior compartment 130 that includes a fluid (i.e., a first fluid), such as air. The interior compartment 130 can be sealed so that it is fluid-tight. The fluid in the interior compartment 132 has an interior pressure and an exterior region 132 outside of the bladder 122 has an exterior pressure. The bladder 122 may be stretchable along an axis 138.

The fiber network layer 128 is disposed inside of the bladder 122 and between the first friction layer 124 and the second friction layer 126. The fiber network layer 128 may be a three-dimensional matrix of intertwined fibers, for example. The fiber network layer 128 may have a first side 136 in direct contact with the first friction layer 124 and a second side 138 in direct contact with the second friction layer 126. Thus, a first interface 140 is defined between the first friction layer 124 and the fiber network layer 128 and a second interface 142 is defined between the fiber network layer 128 and the second friction layer 126.

When the fiber network layer 128 is uncompressed, as shown in FIG. 5A, it occupies a first volume. A surface density of the fiber network layer 128 is a ratio of the surface area occupied by fibers 143 to the total surface area of the respective side surface 136, 138. In the uncompressed state, the first and second sides 136, 138 have a first surface density that is relatively low compared to a second surface density of the compressed fiber network layer 128 (FIG. 5B). At the relatively low surface density, large voids 144 are dispersed throughout the fiber network layer 128 between fibers 143. As a result of the relatively low density, a coefficient of friction (μ) at the first and second interfaces 140, 142 (a first coefficient of static friction and a second coefficient of static friction, respectively) is also relatively low compared to that of the compressed fiber network layer 128 (FIG. 5B). Thus, the first friction layer 124, the second friction layer 126, and the fiber network layer 128 can readily slide with respect to one another when the fiber network layer 128 is in the uncompressed state.

When the fiber network layer 128 is compressed, as shown in FIG. 5B, it occupies a second volume less than the first volume. The first and second sides 136, 138 have a second surface density is relatively high compared to the first surface density of the uncompressed fiber network layer 128 (FIG. 5A). At the relatively high density, the fibers 143 are packed closer together and the void space is reduced. Thus, in the compressed state, smaller voids 148 are dispersed throughout the fiber network layer 128 when compared to the uncompressed state (FIG. 5A). As a result of the relatively high surface density, the coefficient of friction (μ) at the first and second interfaces 140, 142 (a third coefficient of static friction and a fourth coefficient of static friction, respectively) is relatively high compared to that of the uncompressed fiber network layer 128 (FIG. 5A). Therefore, the first friction layer 124, the second friction layer 126, and the fiber network layer 128 cannot readily slide with respect to one another when the fiber network layer 128 is in the compressed state.

The fiber network layer 128 can include any compressible network of fibers. A non-limiting example of a fiber network layer 128 includes a mesh scouring pad.

In the relaxed configuration, the fiber network layer 128 has the first volume and the size and shape of the assembly 120 can be manipulated. The interior pressure of the fluid within the interior compartment 130 is decreased from a first interior pressure to a second interior pressure. The decrease in the interior pressure to shift the assembly 120 into the fixed configuration causes the fiber network layer 128 to compress to the second volume. Therefore, both the pressure differential (P) and the coefficient of friction (μ) increase to increase the friction force (F). The result is a more drastic change in the stiffness when compared to an assembly having only a change in pressure differential (P) (e.g., assembly 20 of FIGS. 2A-2B) as the assembly 120 shifts from the relaxed configuration to the fixed configuration.

Although the bladder 122 is shown and described as stretchable, other embodiments having a non-stretchable bladder are contemplated within the scope of the present disclosure. For example, the assembly 120 having the fiber network layer 128 disposed between the friction layers 124, 126 may be deformable without necessarily being stretchable. As described above in the context of assembly 40 of FIGS. 2A-2B, the assembly 120 may be capable of bending, folding, curling, rolling, and twisting in the relaxed configuration. The addition of the compressible fiber network layer 128 is useful reduce the coefficient of friction (μ) and increase the ease of returning the assembly 120 to its undeformed shape.

The fiber network layer 128 can also be used in other embodiments. In one example, the fiber network layer 128 can be cylindrically shaped and disposed between friction layers of a stretchable or non-stretchable adjustable-stiffness cord (such as the cords of FIGS. 7A-10). In another example, the fiber network layer 128 can be disposed between friction layers in a positive pressure adjustable-stiffness assembly (such as the assemblies of FIGS. 11A-15C).

With reference to FIGS. 6A-6B, still another stretchable adjustable-stiffness assembly 150 is provided. The assembly 150 may be similar to the assembly 40 of FIGS. 2A-2B, with the addition of a pair of inflatable tubes 152. The assembly 150 may include a bladder 154 that is stretchable along a first axis 156, and first and second friction layers (not shown). The bladder 154, first friction layer, and second friction layer may be similar to the bladder 42, first friction layer 44, and second friction layer 46 of the assembly 40 of FIGS. 2A-2B. The bladder 154 may include an interior compartment 162 containing a first fluid.

The inflatable tubes 152 may be fixed to the bladder 154 and at least partially defined by longitudinal axes 164. The longitudinal axes 164 may be substantially parallel to the first axis 156. Each inflatable tube 152 may include an interior cavity 166. The interior cavity 166 may include a second fluid, such as air. The interior cavities 166 of the inflatable tubes 152 may be fluidly separated from the interior compartment 162 of the bladder 154. Thus, an interior pressure of the interior compartment 162 and a cavity pressure of the interior cavity 166 can be separately and independently controlled.

When the assembly 150 is in the relaxed configuration, the cavity pressure can be increased from a first cavity pressure to a second cavity pressure. The pressure increase in the interior cavity 166 may cause the inflatable tubes 152 to lengthen from a first dimension 168 (FIG. 6A) to a second dimension 170 (FIG. 6B), thereby lengthening the assembly from the first dimension 168 to the second dimension 170. While the cavity pressure is at the second cavity pressure and the assembly 150 is at the second dimension 170, the interior pressure of the interior compartment 162 can be decreased from the first interior pressure to the second interior pressure to bring the assembly 150 into the fixed configuration. The assembly 150 will remain in the fixed configuration while the interior compartment is at the second interior pressure regardless of the cavity pressure. However, to return the assembly 150 to the relaxed configuration, the cavity pressure must be greater than the second cavity pressure (e.g., the first cavity pressure), and the interior compartment pressure must be greater than the second interior pressure (e.g., the first interior pressure).

Referring now to FIGS. 7A-8C, yet another stretchable adjustable-stiffness assembly 180 is provided. The assembly 180 can be shifted between a relaxed configuration and a fixed configuration. The assembly 180 includes a tube 182 (i.e., casing), a first friction layer 184, and a second friction layer 186.

Aside from its shape, the tube 182 may be similar to the bladder 42 of the assembly 40 of FIGS. 2A-2B. The tube 182 has a longitudinal axis 188 (i.e., the first axis). The tube 182 includes an interior compartment 190 that includes a fluid (i.e., a first fluid), such as air. The interior compartment 190 can be sealed so that it is fluid-tight. The fluid in the interior compartment 190 has an interior pressure. An exterior region 192 outside of the tube 182 has an exterior pressure.

The first friction layer 184 is disposed inside of the second friction layer 186 so that it is substantially concentric with the second friction layer 186. Both the first friction layer 184 and the second friction layer 186 are disposed inside of the tube 182. The first friction layer 184, the second friction layer 186, and the tube 182 are aligned along the longitudinal axis 188. The first friction layer 184 includes a helically-wound braid 194 (i.e., having the structure of a finger trap toy). A first end 196 of the helically-wound braid 194 may be fixed to a first end 198 of the tube 182. A second end 200 of the helically-wound braid 194 may be fixed to a second end 202 of the tube 182.

The helically-wound braid 194 can stretch between a retracted state (FIG. 8A) and an extended state (FIG. 8B). In the retracted state, the helically-wound braid 194 has a first diameter 204 and a retracted length 206. In the extended state, the helically-wound braid 194 has a second diameter 208 less than the first diameter 204 and an extended length 210 greater than the retracted length 206.

The second friction layer 186 includes a first half 212 and a second half 214. The second half 212 may have a geometry that mirrors the geometry of the first half 212. The first half 212 includes a first cylindrical support 216 and a first plurality of circumferentially-disposed arms 218. The cylindrical support 216 and arms 218 may be made of the same material or different materials. The first cylindrical 216 support is fixed with respect to the tube 182 at the first end 198 of the tube 182. The arms 218 project from the first cylindrical support 216 in a first direction 220 substantially parallel to the longitudinal axis 188. The arms 218 are spaced apart to define a respective plurality of circumferentially disposed openings 222 disposed between the arms 218 and alternating with the arms 218 about the longitudinal axis 188. The arms and the openings have a width 224.

The second half 214 includes a second cylindrical support 226 and a second plurality of circumferentially-disposed arms 228. The second cylindrical support 226 is fixed with respect to the tube 182 at the second end 202 of the tube 182. The arms 228 project from the second cylindrical support 226 in a second direction 230 substantially parallel to the longitudinal axis 188 and opposite the first direction 220. The arms 228 are spaced apart to define a respective second plurality of circumferentially-disposed openings 232 disposed between the arms 228 and alternating with the arms 228 about the longitudinal axis 188. The arms 228 and the openings 232 have the width 224.

In one example, the tube 182 is constructed from rubber. The helically-wound braid 194 of the first friction layer 184 is constructed from a sanding roll. The second friction layer 186 is constructed from sandpaper. The sandpaper is adhered to plastic sheets to improve the rigidity of the second friction layer 186. Although the helically-wound braid 194 is described as a single friction layer in the present embodiment, in other embodiments (not shown), a stretchable adjustable-stiffness assembly may include a single woven layer where the individual strands function as separate friction layers.

In the relaxed configuration, the tube 182 can be stretched from a first dimension 234 to a second dimension 236. As shown FIGS. 8A-8B, the first dimension 234 of the tube 182 may be the same as the retracted length 206 of the helically-wound braid 194, and the second dimension 236 of the tube 182 may be the same as the extended length 210 of the helically-wound braid 194. However, in other embodiments, the first dimension 234 may be different than the retracted length 206 and the second dimension 236 may be different than the extended length 210.

When the tube 182 has the first dimension 234 and the helically-wound braid 194 has the retracted length 206, the first and second pluralities of arms 218, 228 are alternatingly meshed together so that the arms 228 of the second plurality respectively occupy the first plurality of openings 222 and the arms 218 of the first plurality respectively occupy the second plurality of openings 232. Therefore, substantially an entire outer surface 238 of the helically-wound braid 194 is concentrically surrounded by the second friction layer 186.

As the tube 182 is stretched from the first dimension 234 to the second dimension 236, the helically-wound braid 194 is stretched from the retracted length 206 to the extended length 210. The arms 218 of the first plurality are translated in the second direction 230 out of respective openings 232 of the second plurality. The arms 228 of the second plurality are translated in the first direction 220 out of respective openings 222 of the first plurality. By way of non-limiting example, a ratio between the second dimension 236 and the first dimension 234 may be greater than or equal to about 1 and less than or equal to about 2, optionally greater than or equal to about 1.1 and less than or equal to about 1.9, optionally, greater than or equal to about 1.2 and less than or equal to about 1.8, optionally greater than or equal to about 1.3 and less than or equal to about 1.7, optionally greater than or equal to about 1.4 and less than or equal to about 1.6, and optionally about 1.5.

In addition to being stretchable, the assembly 180 may also be deformable in the relaxed configuration. In one example, the assembly 180 is deformed by bending (e.g., creating a sharp bend having an angle of greater than 0° and less than 180°). In another example, the assembly 180 is deformed by folding (e.g., creating a sharp bend of about 180° so that the tube 182 has a hairpin shape). In yet another example, the assembly 180 is deformed by curling (e.g., winding the tube 182 into a helical shape as shown in FIG. 8C). In still another example, the assembly 40 is deformed by rolling (e.g., winding the tube into a spiral shape). In still another example, the assembly 180 is deformed by twisting (i.e., about the longitudinal axis 188). The assembly 180 may be deformed by one or more of the actions described above, or in various other ways.

When a desired size (resulting from stretching) and shape (resulting in deforming) are achieved, the assembly 180 can be placed in the fixed configuration. The assembly 180 is placed in the fixed configuration in a similar manner as the assembly 40 of FIGS. 2A-2B, described above (i.e., by reducing the interior pressure). In the fixed configuration, the assembly 180 retains its size and shape. The assembly 180 is returned to the relaxed configuration in a similar manner as the assembly 40 of FIGS. 2A-2B, described above (i.e., by increasing the interior pressure).

Referring to FIG. 9, an example use of the assembly 180 is depicted. A truck 240 may include a bed 242. Two assemblies 180 may be used in the fixed configuration to secure a parcel 244 in the bed 242 of the truck 240. In various aspects, a method of using the assembly 180 as a restraint is provided. A user places the parcel 244 on the bed 242. The user places one or more assemblies 180 in the relaxed configuration around the parcel 244. The assemblies 180 can be readily manipulated to conform to the parcel 244 in the relaxed configuration. When the assemblies 180 are positioned, the user applies a vacuum to the tube 182 to reduce the interior pressure to the second interior pressure and shift the assembly 180 to the fixed configuration. In one example, the user manually applies the vacuum, such as through use of a button or user interface device located on or in the vehicle. In another example, the vacuum turns on after a time delay. In yet another example, the vacuum is vent-driven such that it turns on when the user shifts the truck 240 into drive. The user can increase the interior pressure of the assemblies 180 to return the assemblies to the relaxed configuration so that they can be remove to free the parcel 244.

With reference to FIGS. 10A-10D, still another stretchable adjustable-stiffness assembly 250 is provided. The assembly 250 can be shifted between a relaxed configuration and a fixed configuration. The assembly 250 includes a tube 252 (i.e., casing) having a longitudinal axis 253, two first friction layers 254, and two second friction layers 256. The assembly 250 also includes a first planar support 258, a second planar support 260, and a third planar support 262. The first, second, and third planar supports 258, 260, 262 may be disposed parallel to one another and to the longitudinal axis 253.

The first planar support 258 may extend from a first end support 264. The second and third planar supports 260, 262 may extend from a second end support 266. The second and third planar supports 260, 262 may be spaced apart from one another to define a channel 268 having a height 270. The first, second, and third planar supports 258, 260, 262, and the first and second end supports 264, 266 may be disposed within the tube 252. The first end support 264 and a first end 272 of the tube 252 may be attached to a first connector 274. The second end support 266 and a second end 276 of the tube 252 may be attached to a second connector 278. The first and second connectors 274, 278 may be at least partially disposed outside of the tube 252.

Inside the tube 252, a first surface 280 of the first planar support 258 may be disposed toward a second surface 282 of the second planar support 260. A third surface 284 of the first planar support 258 may be disposed toward a fourth surface 286 of the third planar support 262. The first and third surfaces 280, 284 of the first planar support 258 may have first friction layers 254 disposed thereon. Together, the first planar support 258, and two first friction layers 254 may have the height 270. The second surface 282 of the second planar support 260 and the fourth surface 286 of the third planar support 262 may have second friction layers 256 disposed thereon.

The planar supports 258, 260, 262 can translate between a first state and a second state. In the first state, the first planar support 258 is disposed within the channel 268 so that the first friction layers 254 engage the second friction layers 256. In moving from the first state to the second state, the first planar support 258 slides partially out of the channel 268 along the longitudinal axis 253. FIG. 10B shows the first planar support 258 partially disposed within the channel 268.

In the relaxed configuration, the tube 252 is stretchable along the longitudinal axis 253. At least one of the first or second connectors 274, 278 moves apart from the other of the first connector 274 and the second connector 278 to increase a tube length 288 from a first dimension to a second dimension. As the connectors 274, 278 move apart, the first planar surface 258 slides with respect to the channel 268 from the first position to the second position. The length of the tube 252 in the fixed configuration can be any dimension greater than or equal to the first dimension and less than or equal to the second dimension. A ratio of second dimension to first dimension may be similar to the ratio of second dimension to first dimension of the bladder 42 of FIGS. 2A-2B, described above. The assembly 250 can be placed in the fixed configuration in a similar manner as the assembly 40 of FIGS. 2B-2B, as described above. Likewise, the assembly 250 can be shifted from the fixed configuration back to the relaxed configuration in a similar manner as the assembly 40 of FIGS. 2A-2B.

Referring to FIG. 10D, an example use of the assembly 250 is used as a travel limiter for an orifice. A vehicle 290 includes a body 292 having an orifice, such as an access orifice, or passage 294 (e.g., an opening for a passenger to enter the vehicle 290). The vehicle 290 also includes a cover or door 296 (e.g., a vehicle door) that is pivotally connected to the body 292. The door is pivotable about a pivot axis 298 between a closed position (to prevent access to an interior of the vehicle 290 through the passage 294) and a fully open position (to permit access to the interior of the vehicle 290 through the passage 294). By way of non-limiting example, in the closed position, the door 296 may form a first angle (not shown) of about 0° with respect to the body 292, and in the fully open position, the door 296 may form a second angle (not shown) of about 90° with respect to the body 292.

When the assembly 250 is in the relaxed configuration, the door 296 is freely pivotable about the pivot axis 298. As the door 296 pivots from the closed position to the fully open position, the tube 252 stretches along the longitudinal axis 253 and increases in length. As the door 296 pivots from the fully open position to the closed position, the tube 252 returns to the first dimension and decreases in length. Because the assembly 250 can be fixed at any length, the door 296 can be locked at any position between the open position and the closed position. Thus, the door 296 can be fixed at a lock angle with respect to the body 292 that is greater than or equal to the first angle and less than or equal to the second angle. By way of non-limiting example, the lock angle may be greater than or equal to about 0° and less than or equal to about 90°.

A vacuum may be used to control the interior pressure within the tube 252. The user may control the vacuum to change the stiffness of the assembly 180 in a variety of ways. In one example, the assembly 180 may be in the fixed configuration by default. A user may hold a button on the door 296 to put the assembly 180 in the relaxed configuration and maintain the assembly 180 in the relaxed configuration while pivoting the door 296. The user may release the button to return the assembly 180 to the fixed configuration and lock the position of the door 296. In another example, the assembly 180 may be in the relaxed configuration by default. The user may press a button to lock the position of the door 296. The user may press the button again to return the assembly 180 to the relaxed configuration to enable motion of the door 296.

Some travel limiters for vehicle doors use engagement of a mechanical feature on one of the door and the body with a detent on the other of the door and the body to retain the door in an open position ("fixed-position travel limiters"). In such embodiments, the fixed-position travel limiter may only be capable of holding the door in a discreet set of preplanned positions (e.g., two or three). The mechanical feature can be released from the detent by apply a force to the door. The force required to move the door out of the predetermined position may be about 2 N.

In contrast to the fixed position-travel limiter described above, the travel limiter including the assembly 180 of the present disclosure can be used to lock the door 296 at any position between the closed position and the open position; it is not limited to a discreet set of preplanned positions. When the assembly 180 is in the relaxed configuration, the door 296 can be readily pivoted about the pivot axis 298. However, when the assembly 180 is in the fixed configuration, a higher force is required to move the door 296 from the locked position when compared to the fixed-position travel limiter described above. By way of non-limiting example, the force may be greater than about 2 N and less than or equal to about 10 N, optionally greater than or equal to about 2 N and less than or equal to about 9 N, optionally greater than or equal to about 2.5 N and less than or equal to about 8 N, optionally greater than or equal to about 3 N and less than or equal to about 7 N, optionally greater than or equal to about 3.5 N and less than or equal to about 6 N, optionally greater than or equal to about 4 N and less than or equal to about 5 N, and optionally about 4.5 N.

The travel limiter including the assembly 180 of the present disclosure may have a lighter weight compared to the fixed position travel limiter. In one embodiment, the tube 252 is made from rubber, the first friction layers 254 are rubber, the second friction layers 256 are sandpaper, and the planar supports 258, 206, 262, end supports 264, 266, and connectors 274, 278 are all constructed from aluminum.

As discussed above, with reference to FIG. 1, the pressure differential (P) in equation 1 is achieved using a negative pressure approach. The negative pressure is generated by decreasing the interior pressure of the casing so that it is lower than the exterior pressure, which may be atmospheric pressure. In each of the embodiments described above in FIGS. 2A-10D, where the exterior pressure is atmospheric pressure, the pressure differential (P) is limited by atmospheric pressure. While the interior pressure can theoretically approach a perfect vacuum (i.e., 0 torr), it cannot go below 0 torr. In various aspects, the present disclosure provides another adjustable-stiffness assembly that achieves a pressure differential by using a "positive pressure" approach. That is, a pressure in a bladder is increased above the exterior pressure (which may be atmospheric pressure) to achieve the desired friction force (F). The positive pressure approach can therefore result in pressure differentials (P) higher than atmospheric pressure and higher than those attainable using the negative pressure approach. The positive pressure embodiments described below have the additional advantage of being operable with a single positive pressure pump.

Referring to FIGS. 11A-11C, another adjustable-stiffness assembly 310 is provided. The assembly 310 can be shifted between a relaxed configuration (FIG. 11B) and a fixed configuration (FIG. 11C). The assembly 310 includes a housing 312 and a plurality of friction layers 314. The friction layers 314 are disposed at least partially within the housing 312.

The housing 312 may provide an inflation constraint. As non-limiting examples, housing 312 materials may include webbing or a knitted pocket. Unlike the various casings described above in FIGS. 2A-10D, the housing 312 does not need to be continuous. Thus, it may cooperate with another surface (e.g., a surface of a vehicle body) to enclose the friction layers 314 (see, e.g., FIGS. 15A-15C). The housing 312 may be substantially sheet-shaped. That is, the housing 312 may have a height 316 that is substantially less than a length 318 and a width 320. The housing 312 is optionally stretchable, similar to the bladder 42 of the assembly 40 of FIGS. 2A-2B.

The plurality of friction layers 314 may be a plurality of inflatable bladders 322. The inflatable bladders 322 can be sealed so that they are fluid-tight. Each bladder 322 may contain a fluid, such as air. The fluid has an interior pressure or a bladder pressure. An exterior region outside of the bladders 322 has an exterior pressure. By way of non-limiting example, the bladders 322 may be formed from an elastic material such as a thermoset rubber or a thermoplastic elastomer (TPE). Although each bladder 322 is shown as being sheet-shaped and having a single interior chamber, other bladder 322 shapes are contemplated. In one example, the bladders are cord shaped (see, e.g., FIGS. 12A-12C). The individual bladder geometry does necessarily not need to match the housing geometry. In another example, the bladders include multiple interconnected fluid pockets (see, e.g., FIGS. 15A-15B). Moreover, the quantity of bladders need not be limited to three, as shown in the figures.

In the relaxed configuration, the bladders 322 have bladder pressure. The first bladder pressure may be less than or equal to the exterior pressure. The friction force (F) between the friction layers 314 (i.e., bladders 322) may be low enough that the friction layers 314 can readily slide with respect to one another and the assembly 310 can be deformed or stretched (if the bladder 322 is stretchable). The assembly 310 can be deformed or stretched in a similar manner as the assembly 40 of FIGS. 2A-2B.

When a desired shape (resulting in deforming) and size (resulting from stretching) are achieved, the assembly 310 can be placed in the fixed configuration. The assembly 310 is placed in the fixed configuration by inflating the bladders 322 to a second bladder pressure greater than the first bladder pressure and the exterior pressure.

As the bladder pressure increases, the friction layers 314 engage one another and the friction force (F) between the friction layers 314 increases. Thus, the stiffness of the assembly 310 is increased in the fixed configuration compared to the relaxed configuration and the assembly 310 is retained at the deformed shape and size. The assembly 310 can be returned to the relaxed configuration by decreasing bladder pressure until the friction force (F) is low enough for the friction layers 314 to slide with respect to one another and for the shape of the assembly 310 to be manipulated. For example, the bladder pressure may be decreased from the second bladder pressure to the first bladder pressure.

With reference to FIGS. 12A-12C, yet another adjustable-stiffness assembly 330 is provided. The assembly 330 can be shifted between a relaxed configuration (FIG. 12B) and a fixed configuration (FIG. 12C). The assembly 330 includes a housing 332 having a plurality of friction layers 334 disposed inside the housing 332. The adjustable friction layers 334 may be inflatable bladders 336. The assembly 330 is similar to the adjustable stiffness assembly 310 of FIGS. 11A-11C; thus, only the differences will be discussed. In the assembly 330, both the housing 332 and the inflatable bladders 336 are cord-shaped. The assembly 330 can be shifted between the relaxed configuration and the fixed configuration in a similar manner as the assembly 310 of FIGS. 11A-11C, discussed above.

Referring to FIGS. 13A-13C, still another adjustable-stiffness assembly 340 is provided. The assembly 340 can be shifted between a relaxed configuration (FIG. 13B) and a fixed configuration (FIG. 13C). The assembly includes a housing 342, a first friction layer 344, one or more second friction layers 346. The housing 342 may be similar to the housing 332 of FIGS. 12A-12C. The first friction layer 334 may be an inflatable bladder 348 similar to the inflatable bladders 336 of FIGS. 12A-12C. The second friction layers 346 may be cord-shaped, non-inflatable, and otherwise similar to any of the friction layers of FIGS. 2A-10D.

The first friction layer 344 and second friction layers 334 may be disposed inside the housing 342. The first friction layer 344 may be disposed inside the second friction layers 346. The second friction layers 346 may be concentrically disposed with respect to one another. The first friction layer 334 may be an inflatable tube. The housing 340, first friction layer 344, and second friction layers 346 may all be coaxially disposed with respect to a longitudinal axis 350.

In the relaxed configuration, the inflatable bladder 348 has a first bladder pressure. The first bladder pressure may be less than or equal to an exterior pressure. A friction force (F) between the first and second friction layers 344, 346 may be low enough that they can slide with respect to one another and the assembly 340 can be deformed or stretched (if the housing 342 is stretchable). The assembly 310 can be deformed in a similar manner as the assembly 180 of FIGS. 8A-8C.

When a desired shape (resulting in deforming) and size (resulting from stretching) are achieved, the assembly 340 can be placed in the fixed configuration. The assembly 340 is placed in the fixed configuration by inflating the inflatable bladder 348 to a second bladder pressure greater than the first bladder pressure and the exterior pressure. The first friction layer 344 engages the second friction layer 344.

With reference to FIGS. 14A-14C, yet another adjustable-stiffness assembly 360 is provided. The assembly 360 cab be shifted between a relaxed configuration (FIG. 14B) and a fixed configuration (FIG. 14C). The assembly 360 includes a housing 362, a first friction layer 364, second friction layers 366, a third friction layer 368, and a vehicle structure 370.

The housing 362 may be stretchable and non-continuous. The housing 362 may extend around the first, second, and third friction layers 364, 366, 368 and cooperate with the vehicle structure 370 to enclose the first, second, and third friction layers 364, 366, 368 against the vehicle structure 370. Thus, the vehicle structure 370 provides an outer constraint for the assembly 360.

The first friction layer 364 may be an inflatable bladder 372 similar to the inflatable bladders 322 of assembly 310 of FIGS. 11A-11C. The second and third friction layers 366, 368 may be non-inflatable. Thus, the second and third friction layers 366, 368 may be similar to the first and second friction layers 44, 46 of assembly 40 of FIGS. 2A-2B. The second friction layers 366 may be attached to the housing 362 at a first end 374 of the housing 362. The third friction layer 368 may be attached to the housing 362 at a second end 376 of the housing 362.

When the assembly 360 is in the relaxed configuration, the housing 362 may be stretchable along an axis 378. The housing 362 may be capable of being attached to the vehicle structure 370 at multiple different locations (not shown) to accommodate different stretch dimensions. Thus, in the relaxed configuration, a length 380 of the assembly 360 can be changed. For example, a user could detach the first end 374 of the housing 362 from the vehicle structure 370 and translate it in a first direction 382 along the axis 378. As the housing 362 is stretched in the first direction 382, the second friction layers 366 also translate in the first direction along the axis 378. Thus, an interface 384 between the second and third friction layers 366, 368 decreases.

When the desired length is achieved, the user can reattach the first end 374 of the housing 362 to the vehicle structure 370. The bladder 372 can be inflated to engage the friction layers 364, 366, 368 with one another and shift the assembly 360 into the fixed configuration.

Referring now to FIGS. 15A-15C, still another adjustable-stiffness assembly 390 is provided. The assembly 390 can be shifted between a relaxed configuration (FIG. 15A) and a fixed configuration (FIG. 15B). The assembly 390 includes a bladder 392 and a plurality of friction layers 394. The assembly 390 may be similar to the assembly 310 of FIGS. 11A-11C. Therefore, only the differences will be discussed.

Each friction layer 394 may include a plurality of interconnected fluid pockets 396. By way of non-limiting example, the fluid pockets 396 may resemble inflatable cords (having a length much greater than a width) or bubbles (having approximately equal lengths and widths). In comparison to the bladders 322 of the assembly 310 of FIGS. 11A-11C, the friction layers 394 may be easier to manipulate into deformed shapes (as shown in FIG. 15B) and retain in deformed shapes (as shown in FIG. 15C). The assembly 390 can be shifted between the relaxed configuration and the fixed configuration in a similar manner as the assembly 310 of FIGS. 11A-11C, discussed above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A stretchable adjustable-stiffness assembly comprising:
a casing configured to be fluidly sealed, the casing defining a first axis and comprising an interior compartment containing a first fluid, the first fluid being configured to shift between a first interior pressure and a second interior pressure that is less than both the first interior pressure and an exterior pressure external to the casing;
a first friction layer at least partially disposed within the interior compartment; and
a second friction layer at least partially disposed within the interior compartment, wherein:
the stretchable adjustable-stiffness assembly is configured to shift between a relaxed configuration and a fixed configuration;
in the relaxed configuration, the first fluid has the first interior pressure, the casing is stretchable along the first axis such that a casing length varies between a first dimension and a second dimension greater than the first dimension, and the stretchable adjustable-stiffness assembly has a first stiffness;
in the fixed configuration, the first fluid has the second interior pressure, the casing length is fixed at greater than or equal to the first dimension and less than or equal to the second dimension, the first friction layer engages the second friction layer, and the stretchable adjustable-stiffness assembly has a second stiffness greater than the first stiffness;
the first friction layer and the second friction layer each comprise at least one sheet, the first friction layer is fixed to the casing at a first edge of the casing and the second friction layer is fixed to the casing at a second edge of the casing.
the casing defines a second axis substantially perpendicular to the first axis and in the relaxed configuration, the casing is configured to be stretchable along the second axis such that a casing width varies between a third dimension and a fourth dimension greater than the third dimension; and
in the fixed configuration, the casing width is fixed at greater than or equal to the third dimension and less than or equal to the fourth dimension.

2. The stretchable adjustable-stiffness assembly of claim 1, wherein in the relaxed configuration, the stretchable adjustable-stiffness assembly is flexible such that it is configured to be at least one of bent, folded, curled, rolled, and twisted.

3. The stretchable adjustable-stiffness assembly of claim 1, wherein the first friction layer and the second friction layer are in direct sliding contact, and at least one of the first friction layer and the second friction layer is configured to translate along the first axis with respect to the other of the first friction layer and the second friction layer as the casing is stretched.

4. The stretchable adjustable-stiffness assembly of claim 1, wherein the stretchable adjustable-stiffness assembly is used as a component selected from the group consisting of: a cargo restraint, a travel limiter for a door, a window shade, a cover for a storage area, a partition, and combinations thereof.

5. The stretchable adjustable-stiffness assembly of claim 1, further comprising an inflatable tube fixed to the casing and disposed substantially parallel to the first axis, the inflatable tube comprising an interior cavity and being fluidly separated from the interior compartment, wherein:
the interior cavity contains a second fluid at a cavity pressure, the cavity pressure being configured to vary between a first cavity pressure and a second cavity pressure greater than the first cavity pressure;
the inflatable tube is configured to lengthen from a first length to a second length when the cavity pressure increases from the first cavity pressure to the second cavity pressure; and
the lengthening of the inflatable tube stretches the casing from the first dimension to the second dimension.

6. The stretchable adjustable-stiffness assembly of claim 1, further comprising a fiber network layer disposed between the first friction layer and the second friction layer, the fiber network layer being compressible and configured to vary between a first volume and a second volume less than the first volume as the first fluid varies between the first interior pressure and the second interior pressure, such that in the relaxed configuration, the fiber network layer has the first volume and in the fixed configuration the fiber network layer has the second volume, wherein:
when the fiber network layer has the first volume, a first coefficient of static friction between the fiber network layer and the first friction layer has a first value and a second coefficient of static friction between the fiber network layer and the second friction layer has a second value; and
when the fiber network layer has the second volume, the first coefficient of static friction has a third value that is greater than the first value, and the second coefficient of static friction has a fourth value that is greater than the second value.

7. An adjustable-stiffness assembly comprising:
a housing comprising an interior compartment;
a first friction layer at least partially disposed within the housing;
a second friction layer at least partially disposed within the housing and configured to engage the first friction layer, wherein:
the adjustable-stiffness assembly is configured to shift between a relaxed configuration and a fixed configuration;
at least one of the first friction layer and the second friction layer comprises an inflatable bladder containing a fluid, the fluid being configured to vary between a first bladder pressure and a second bladder pressure greater than both the first bladder pressure and an exterior pressure outside of the inflatable bladder;
wherein in the relaxed configuration, the fluid has the first bladder pressure, the adjustable-stiffness assembly is configured to be at least one of stretched, bent, folded, curled, rolled, and twisted into an assembly shape, and the adjustable-stiffness assembly has a first stiffness; and
in the fixed configuration, the fluid has the second bladder pressure, the first friction layer engages the second friction layer, the adjustable-stiffness assembly shape is fixed, and the adjustable-stiffness assembly has a second stiffness greater than the first stiffness.

8. The adjustable-stiffness assembly of claim 7, wherein the first friction layer comprises a first inflatable bladder and the second friction layer comprises a second inflatable bladder.

9. The adjustable-stiffness assembly of claim 7, wherein the first friction layer comprises the inflatable bladder and the second friction layer comprises a non-inflatable material.

10. The adjustable-stiffness assembly of claim 7, wherein the housing defines a first axis so that:
- in the relaxed configuration, the housing is configured to be stretchable along the first axis of the housing such that a housing length varies between a first dimension and a second dimension greater than the first dimension; and
- in the fixed configuration, the housing length is fixed at greater than or equal to the first dimension and less than or equal to the second dimension.

11. A stretchable adjustable-stiffness assembly comprising:
- a tubular casing configured to be fluidly sealed, the tubular casing defining a longitudinal axis and comprising an interior compartment containing a first fluid, the first fluid being configured to shift between a first interior pressure and a second interior pressure that is less than both the first interior pressure and an exterior pressure external to the tubular casing;
- a first friction layer at least partially disposed within the interior compartment; and
- a second friction layer at least partially disposed within the interior compartment, the first friction layer being disposed radially inside of the second friction layer, wherein:
- the stretchable adjustable-stiffness assembly is configured to shift between a relaxed configuration and a fixed configuration;
- in the relaxed configuration, the first fluid has the first interior pressure, the tubular casing is stretchable along the longitudinal axis such that a casing length varies between a first dimension and a second dimension greater than the first dimension, and the stretchable adjustable-stiffness assembly has a first stiffness;
- in the fixed configuration, the first fluid has the second interior pressure, the casing length is fixed at greater than or equal to the first dimension and less than or equal to the second dimension, the first friction layer engages the second friction layer, and the stretchable adjustable-stiffness assembly has a second stiffness greater than the first stiffness;
- one of the first friction layer and the second friction layer comprises a helically-wound braid configured to shift between a retracted state and an extended state when the stretchable adjustable-stiffness assembly is in the relaxed configuration;
- in the retracted state, the helically-wound braid has a first diameter and a retracted length along the longitudinal axis; and
- in the extended state, the helically-wound braid has a second diameter smaller than the first diameter and an extended length along the longitudinal axis, the extended length being greater than the retracted length.

12. The stretchable adjustable-stiffness assembly of claim 11, wherein the stretchable adjustable-stiffness assembly is used as a component selected from the group consisting of: a cargo restraint, a travel limiter for a door, a cover for a storage area, a partition, and combinations thereof.

13. The stretchable adjustable-stiffness assembly of claim 11, wherein in the relaxed configuration, the stretchable adjustable-stiffness assembly is flexible such that it is configured to be at least one of bent, folded, curled, rolled, and twisted.

14. The stretchable adjustable-stiffness assembly of claim 11, further comprising an inflatable tube fixed to the tubular casing and disposed substantially parallel to the longitudinal axis, the inflatable tube comprising an interior cavity and being fluidly separated from the interior compartment, wherein:
- the interior cavity contains a second fluid at a cavity pressure, the cavity pressure being configured to vary between a first cavity pressure and a second cavity pressure greater than the first cavity pressure;
- the inflatable tube is configured to lengthen from a first length to a second length when the cavity pressure increases from the first cavity pressure to the second cavity pressure; and
- the lengthening of the inflatable tube stretches the tubular casing from the first dimension to the second dimension.

15. A door assembly comprising:
- a body including an orifice;
- a door pivotally connected to the body, the door being configured to move between a closed position to prevent access to the orifice and a fully open position to permit access to the orifice; and
- a travel limiter comprising,
  - a tubular casing configured to be fluidly sealed, the tubular casing defining a longitudinal axis and comprising an interior compartment containing a first fluid, the first fluid being configured to shift between a first interior pressure and a second interior pressure that is less than both the first interior pressure and an exterior pressure external to the tubular casing;
  - a first friction layer at least partially disposed within the interior compartment;
  - a first planar support disposed at least partially within the interior compartment and comprising a first surface, the first friction layer being disposed on the first surface;
  - a second friction layer at least partially disposed within the interior compartment;
  - a second planar support substantially parallel to the first planar support and disposed at least partially within the interior compartment and comprising a second surface disposed toward the first surface of the first planar support, the second friction layer being disposed on the second surface, wherein:
- the travel limiter is configured to shift between a relaxed configuration and a fixed configuration;
- in the relaxed configuration, the first fluid has the first interior pressure, the tubular casing is stretchable along the longitudinal axis such that a casing length varies between a first dimension and a second dimension greater than the first dimension, and the travel limiter has a first stiffness; and
- in the fixed configuration, the first fluid has the second interior pressure, the casing length is fixed at greater than or equal to the first dimension and less than or equal to the second dimension, the first friction layer engages the second friction layer, and the travel limiter has a second stiffness greater than the first stiffness;
- a first end of the tubular casing and one of the first planar support and the second planar support are connected to the body;
- a second end of the tubular casing and the other of the first planar support and the second planar support are connected to the door;

when the travel limiter is in the relaxed configuration, the door is pivotable between the closed position and the fully open position; and when the travel limiter is in the fixed configuration, a position of the door is fixed with respect to the body.

16. The door assembly of claim 15, wherein:

in the closed position, the door forms a first angle with respect to the body;

in the fully open position, the door forms a second angle with respect to the body; and the door is configured to be fixed at a lock angle greater than or equal to the first angle and less than or equal to the second angle.

* * * * *